United States Patent
Kovacs et al.

(10) Patent No.: US 12,531,444 B2
(45) Date of Patent: *Jan. 20, 2026

(54) POWER CAPABILITY DETECTION IN PRECISION POWER LEVEL CONTROL SYSTEMS FOR WIRELESS POWER TRANSMISSION

(71) Applicant: NuCurrent, Inc., Chicago, IL (US)

(72) Inventors: Andrew Kovacs, Lafayette, IN (US); Jason Green, Evanston, IL (US)

(73) Assignee: NuCurrent, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/628,528

(22) Filed: Apr. 5, 2024

(65) Prior Publication Data

US 2024/0405613 A1 Dec. 5, 2024

Related U.S. Application Data

(63) Continuation of application No. 18/085,323, filed on Dec. 20, 2022, now Pat. No. 11,955,820, which is a
(Continued)

(51) Int. Cl.
| | | |
|---|---|---|
| *H02J 50/80* | (2016.01) | |
| *H02J 50/12* | (2016.01) | |
| *H02J 50/70* | (2016.01) | |

(52) U.S. Cl.
CPC .............. *H02J 50/80* (2016.02); *H02J 50/12* (2016.02); *H02J 50/70* (2016.02)

(58) Field of Classification Search
CPC ............. H02J 50/12; H02J 50/70; H02J 50/80
See application file for complete search history.

(56) References Cited

U.S. PATENT DOCUMENTS

| | | | |
|---|---|---|---|
| 6,075,433 A | 6/2000 | Ono et al. | |
| 6,941,480 B1 | 9/2005 | Dai | |

(Continued)

FOREIGN PATENT DOCUMENTS

| | | | |
|---|---|---|---|
| CN | 111092493 A | 5/2020 | |
| JP | 2012228099 A | 11/2012 | |

(Continued)

OTHER PUBLICATIONS

U.S. Appl. No. 18/607,835, filed Mar. 2024, Kovacs; Andrew.*
(Continued)

*Primary Examiner* — Rexford N Barnie
*Assistant Examiner* — Joseph N Inge
(74) *Attorney, Agent, or Firm* — Lee Sullivan Shea & Smith LLP

(57) ABSTRACT

A power transmitter for wireless power transfer includes a control and communications unit, an inverter circuit, a coil, and a shielding. The control and communications unit is configured to provide power control signals to control a power level of a power signal configured for transmission to a power receiver, provide a power request to an external power supply, determine if a power signal at the coil is compliant with the power request, and, if the power signal at the coil is compliant with the power request, continue to operate for wireless power transmission. The coil is configured to transmit the power signal to a power receiver. The shielding comprises a ferrite core.

20 Claims, 18 Drawing Sheets

Related U.S. Application Data continuation of application No. 17/245,949, filed on Apr. 30, 2021, now Pat. No. 11,539,247.

(56) References Cited

U.S. PATENT DOCUMENTS

| | | |
|---|---|---|
| 7,960,944 B2 | 6/2011 | Hoffman et al. |
| 9,508,487 B2 | 11/2016 | Von Novak et al. |
| 9,912,187 B2 | 3/2018 | Sultenfuss et al. |
| 10,205,351 B2 | 2/2019 | Lee |
| 10,211,663 B2 | 2/2019 | Matsuyuki et al. |
| 10,333,333 B2 | 6/2019 | Ritter et al. |
| 10,410,789 B2 | 9/2019 | Kurs |
| 10,454,309 B2 | 10/2019 | Byun |
| 10,536,035 B2 | 1/2020 | Joye et al. |
| 10,608,475 B2 | 3/2020 | Bae et al. |
| 10,637,295 B2 | 4/2020 | Mao |
| 10,978,246 B2 | 4/2021 | Bae |
| 10,978,921 B1 | 4/2021 | Wang et al. |
| 11,038,376 B2 | 6/2021 | Hemphill et al. |
| 11,081,911 B1 | 8/2021 | Nalbant et al. |
| 11,515,738 B2 | 11/2022 | Louis et al. |
| 11,532,956 B2* | 12/2022 | Kovacs ............ H02J 50/80 |
| 11,539,247 B2* | 12/2022 | Kovacs ............ H02J 50/80 |
| 11,637,648 B2 | 4/2023 | Kim et al. |
| 11,735,962 B2 | 8/2023 | Schwartz et al. |
| 11,764,621 B1 | 9/2023 | Hu et al. |
| 11,784,512 B2 | 10/2023 | Narayanan et al. |
| 11,997,836 B1 | 5/2024 | Thirumalai Ananthan Pillai et al. |
| 2004/0261422 A1 | 12/2004 | McEuen et al. |
| 2005/0068019 A1 | 3/2005 | Nakamura et al. |
| 2005/0288743 A1 | 12/2005 | Ahn et al. |
| 2006/0209487 A1 | 9/2006 | Schmidt et al. |
| 2011/0018498 A1 | 1/2011 | Soar |
| 2011/0062793 A1 | 3/2011 | Azancot et al. |
| 2011/0090726 A1 | 4/2011 | Brotto et al. |
| 2012/0175967 A1 | 7/2012 | Dibben et al. |
| 2012/0217111 A1 | 8/2012 | Boys et al. |
| 2012/0286726 A1 | 11/2012 | Kim et al. |
| 2013/0058380 A1* | 3/2013 | Kim ............ H02J 50/80 455/434 |
| 2013/0069586 A1 | 3/2013 | Jung et al. |
| 2013/0082536 A1* | 4/2013 | Taylor ............ H02J 50/12 307/104 |
| 2013/0127580 A1 | 5/2013 | Dobbs |
| 2013/0162201 A1 | 6/2013 | Yeh |
| 2013/0169062 A1* | 7/2013 | Maikawa ............ B60L 53/124 307/104 |
| 2013/0307468 A1 | 11/2013 | Lee et al. |
| 2014/0002015 A1 | 1/2014 | Tripathi et al. |
| 2014/0239732 A1 | 8/2014 | Mach et al. |
| 2014/0354223 A1 | 12/2014 | Lee et al. |
| 2015/0022013 A1 | 1/2015 | Kim et al. |
| 2015/0091389 A1 | 4/2015 | Byrne et al. |
| 2015/0115880 A1 | 4/2015 | Soar |
| 2015/0214752 A1 | 7/2015 | Gluzman et al. |
| 2015/0222129 A1 | 8/2015 | McCauley et al. |
| 2015/0270740 A1 | 9/2015 | Lee et al. |
| 2015/0270776 A1 | 9/2015 | Mallik et al. |
| 2015/0333532 A1 | 11/2015 | Han et al. |
| 2016/0006289 A1 | 1/2016 | Sever et al. |
| 2016/0043590 A1 | 2/2016 | Ha et al. |
| 2016/0049826 A1 | 2/2016 | Lee et al. |
| 2016/0118179 A1 | 4/2016 | Park et al. |
| 2016/0181821 A1 | 6/2016 | Xu et al. |
| 2016/0372961 A1 | 12/2016 | Ritter et al. |
| 2016/0372963 A1 | 12/2016 | Sankar |
| 2017/0085133 A1 | 3/2017 | Byun |
| 2017/0090531 A1 | 3/2017 | Forbes et al. |
| 2017/0117752 A1 | 4/2017 | Kaechi |
| 2017/0129344 A1 | 5/2017 | Islinger et al. |
| 2017/0133887 A1 | 5/2017 | Tominaga et al. |
| 2017/0194092 A1 | 7/2017 | Vix |
| 2017/0237296 A1 | 8/2017 | Keith et al. |
| 2017/0245679 A1 | 8/2017 | Watts |
| 2017/0279313 A1 | 9/2017 | Hu et al. |
| 2017/0287626 A1 | 10/2017 | Larson et al. |
| 2017/0288465 A1 | 10/2017 | Sugasawa et al. |
| 2017/0310117 A1 | 10/2017 | Nirantare et al. |
| 2017/0310164 A1 | 10/2017 | Abdolkhani et al. |
| 2017/0324283 A1 | 11/2017 | Walton |
| 2017/0331335 A1 | 11/2017 | Brooks et al. |
| 2017/0338695 A1 | 11/2017 | Port |
| 2017/0358950 A1 | 12/2017 | Zeine et al. |
| 2017/0368945 A1 | 12/2017 | Park et al. |
| 2018/0034324 A1 | 2/2018 | Abdolkhani |
| 2018/0123392 A1 | 5/2018 | Pinciuc et al. |
| 2018/0152048 A1 | 5/2018 | Mahmodieh et al. |
| 2018/0204674 A1 | 7/2018 | Cho et al. |
| 2018/0205257 A1 | 7/2018 | Kwon et al. |
| 2018/0233942 A1 | 8/2018 | Qiu et al. |
| 2018/0233954 A1 | 8/2018 | Yang et al. |
| 2018/0233956 A1 | 8/2018 | Moussaoui et al. |
| 2018/0277926 A1 | 9/2018 | Park et al. |
| 2019/0267845 A1 | 8/2019 | Maniktala |
| 2019/0305595 A1 | 10/2019 | Mantha et al. |
| 2019/0384603 A1 | 12/2019 | Kim et al. |
| 2019/0394906 A1 | 12/2019 | Smith et al. |
| 2020/0094700 A1* | 3/2020 | Hui ............ B60L 53/60 |
| 2020/0177028 A1 | 6/2020 | Esteban et al. |
| 2020/0235612 A1 | 7/2020 | Muratov |
| 2020/0373072 A1 | 11/2020 | Leem |
| 2021/0075255 A1 | 3/2021 | Nutting et al. |
| 2021/0159736 A1 | 5/2021 | Miyamoto et al. |
| 2021/0296999 A1 | 9/2021 | Taleb et al. |
| 2021/0354577 A1 | 11/2021 | Books et al. |
| 2022/0407369 A1 | 12/2022 | Hu et al. |
| 2023/0261494 A1 | 8/2023 | Smith et al. |
| 2023/0370115 A1 | 11/2023 | Schwartz et al. |
| 2023/0378822 A1 | 11/2023 | Abukhalaf et al. |
| 2023/0420998 A1 | 12/2023 | Terry et al. |

FOREIGN PATENT DOCUMENTS

| | | |
|---|---|---|
| KR | 101213090 B1 | 12/2012 |
| KR | 20190087733 A | 7/2019 |
| KR | 20200113098 A | 10/2020 |
| WO | 2014092339 A1 | 6/2014 |
| WO | 2015064815 A1 | 5/2015 |
| WO | 2019148070 A2 | 8/2019 |

OTHER PUBLICATIONS

Brownout Definition & Meeting, Merriam-Webster [online], [retrieved Jul. 16, 2022], Retrieved from the internet: http://www.merriam-webster.com/dictionary/brownout, 3 Pages.

International Searching Authority, PCT International Search Report and Written Opinion, PCT International Application No. PCTUS2021030315 , Aug. 20, 2021, 11 pages.

International Searching Authority, PCT International Search Report and Written Opinion, PCT International Application No. PCT/US2021/064964 dated Apr. 28, 2022, 14 pages.

International Searching Authority, PCT International Search Report and Written Opinion, PCT International Application No. PCT/US2022/014409 dated May 16, 2022, 8 pages.

International Searching Authority, PCT International Search Report and Written Opinion, PCT International Application No. PCT/US2022/025650 dated Aug. 9, 2022, 11 pages.

QI Specification: MPP System Specification MPP Communications Protocol, Wireless Power Consortium [online], Version 2.0, Apr. 2023, [retrieved Jan. 22, 2025], Retrieved from the Internet: URL: https://www.wirelesspowerconsortium.com/knowledge-base/specifications/download-the-qi-specifications, 268 pages.

QI Specification, Wireless Power Consortium [online], Version 1.3, Jan. 2021, [retrieved May 21, 2024], Retrieved from the Internet: URL: https://www.wirelesspowerconsortium.com/knowledge-base/specifications/download-the-qi-specifications/, 746 pages.

QI Specification, Wireless Power Consortium [online], Version 2.0, Apr. 2023, [retrieved Jan. 22, 2025], Retrieved from the Internet: URL: https://www.wirelesspowerconsortium.com/knowledge-base/specifications/download-the-qi-specifications, 664 pages.

(56) References Cited

OTHER PUBLICATIONS

EP Extended Search Report, EP Application No. 22792455.2, dated Mar. 31, 2025, 9 pages.
EP Application No. 21797787.5, EP Extended Search Report, Jun. 25, 2024, 15 pages.

* cited by examiner

POWER CAPABILITY DETECTION IN PRECISION POWER LEVEL CONTROL SYSTEMS FOR WIRELESS POWER TRANSMISSION

CROSS-REFERENCE TO RELATED APPLICATIONS

This application is a continuation of, and claims priority to, U.S. Non-Provisional application Ser. No. 18/085,323, filed on Dec. 20, 2022, and entitled "POWER CAPABILITY DETECTION IN PRECISION POWER LEVEL CONTROL SYSTEMS FOR WIRELESS POWER TRANSMISSION," which, in turn, is a continuation of, and claims priority to, U.S. Non-Provisional application Ser. No. 17/245,949, filed on Apr. 30, 2021, and entitled "POWER CAPABILITY DETECTION IN PRECISION POWER LEVEL CONTROL SYSTEMS FOR WIRELESS POWER TRANSMISSION," each of which is incorporated herein by reference in its entirety.

TECHNICAL FIELD

The present disclosure generally relates to systems and methods for wireless transfer of electrical power and, more particularly, to power capability detection in precision power level control for wireless power transmitters.

BACKGROUND

Wireless power transfer systems are used in a variety of applications for the wireless transfer of electrical energy, electrical power signals, electromagnetic energy, electrical data signals, among other known wirelessly transmittable signals. Such systems often use inductive wireless power transfer, which occurs when magnetic fields created by a transmitting element induce an electric field, and hence, an electric current, in a receiving element. These transmission and receiver elements will often take the form of coiled wires and/or antennas.

Because some wireless power transfer systems are operable and/or most efficient in the near-field, some transmitters may be limited to having operability only at restrictively small gaps between the transmitter coil and the receiver coil. To that end, typical wireless power transmitters under the Wireless Power Consortium's Qi™ standard may be limited to operability at a maximum coil-to-coil separation gap (which may be referred to herein as a "separation gap" or "gap") of about 3 millimeters (mm) to about 5 mm. The separation gap is sometimes known as the Z-height or Z-distance and is generally measured as the distance between the transmitter coil and receiver coil.

As the adoption of wireless power grows, commercial applications are requiring a power transmitter capable of transferring power to a power receiver with a gap greater than 3-5 mm. By way of example, cabinets and/or counter tops may be more than 3-5 mm thick and as a result, prevent wireless charging through such furniture. As another example, modern mobile devices may be used with cases, grip devices, and/or wallets, among other things, that can obstruct wireless power transmission to the mobile device and/or create a separation gap that disallows operability of wireless power transmission. Legacy wireless power transmitter designs further may be incapable of desired commercial applications (e.g., through object chargers, under table chargers, infrastructure chargers, ruggedized computing device charging, among other things), due to the limitations in separation gap inherent to legacy, near-field wireless power transfer systems. Increasing the separation gap, while keeping satisfactory performance (e.g., thermal performance, transfer/charging speed, efficiency, etc.) will increase the number of commercial applications that can utilize wireless power.

Further, current standards specifications, regulations, and/or end-user product specifications may require particular power levels, for transmission to a power receiver. To that end, the power receiver may have particular power requests and/or particular limits for efficiency, safety, and/or any other power control reasons. Additionally, some wall plugs for said transmitters may need verification for power capabilities, necessary for the transmission of wireless power.

SUMMARY

New wireless power transmitters and/or associated base stations are desired that are capable of delivering wireless power signals to a power receiver at a separation gap larger than the about 3 mm to about 5 mm separation gaps of legacy transmitters. Further, wireless power transmitters at such larger gap distances may require and/or may be enhanced via more precision and/or granular power controls.

In an embodiment, the overall structure of the transmitter is configured in a way that allows the transmitter to transfer power at an operating frequency of about 87 kilohertz (kHz) to about 205 kHz and achieve the same and/or enhanced relative characteristics (e.g., rate of power transfer, speed of power transfer, power level, power level management, among other things) of power transfer as legacy transmitters that operated in that frequency range. As a result, the separation gap may be increased from about 3-5 mm to around 15 mm or greater using the overall structure of the transmitter. In an embodiment, a transmitter may be configured with a ferrite core that substantially surrounds the transmitter antenna on three sides. The only place that the ferrite core does not surround the transmitter antenna is on the top (e.g., in the direction of power transfer) and where the power lines connect to the transmitter antenna. This overall structure of the transmitter allows for the combination of power transfer characteristics, power level characteristics, self-resonant frequency restraints, design requirements, adherence to standards bodies' required characteristics, bill of materials (BOM) and/or form factor constraints, among other things, that allow for power transfer over larger separation gaps.

Transmission of one or more of electrical energy, electrical power, electromagnetic energy or electronic data signals from one of such coiled antennas to another, generally, operates at an operating frequency and/or an operating frequency range. The operating frequency may be selected for a variety of reasons, such as, but not limited to, power transfer characteristics, power level characteristics, self-resonant frequency restraints, design requirements, adherence to standards bodies' required characteristics, bill of materials (BOM) and/or form factor constraints, among other things. It is to be noted that, "self-resonating frequency," as known to those having skill in the art, generally refers to the resonant frequency of an inductor due to the parasitic characteristics of the component.

In some examples, power profiles, such as those defined by the Qi Standard, may require more sophisticated and/or precision controls, compared to legacy wireless power transmitters. Such examples may involve higher power input to the wireless power transmitter and, thus, more expensive and/or complicated voltage regulation mechanisms may be required in the power conditioning system and/or amplifier design. To that end, utilizing the systems and methods disclosed herein, such voltage regulation mechanisms may be removed from the wireless power transmitter and the wireless power transmitter may utilize control schemes, disclosed herein, to control the input power to the wireless power transmitter, via communications with an external input power source. By utilizing communications with the external power source, bill of materials (BOM) may be decreased, for such power transmitters, resulting in lower cost power transmitters. Additionally or alternatively, by utilizing such control schemes, the power transmitters utilizing said schemes, disclosed herein, may have greater compatibility and/or performance when utilized with off-the-shelf power supplies (e.g., Universal Serial Bus (USB) power supplies, Lightning power supplies, Qualcomm Quick Charge devices, USB-C power supplies, USB-PD (USB Power Delivery) power supplies, Mini-USB power supplies, proprietary power supplies, input/outputs on electronic devices (e.g., a computer, a multi device charger, an automobile console, a mobile device, a portable power supply, a battery, a generator, among other things).

In accordance with one aspect of the disclosure, a power transmitter for wireless power transfer is disclosed. The power transmitter is configured for power transfer at an operating frequency selected from a range of about 87 kilohertz (kHz) to about 205 kHz and includes a control and communications unit, an inverter circuit, a coil, and a shielding. The control and communications unit is configured to provide power control signals to control a power level of a power signal configured for transmission to a power receiver, provide a power request to an external power supply, determine if a power signal at the coil is compliant with the power request, and, if the power signal at the coil is compliant with the power request, continue to operate for wireless power transmission. The inverter circuit is configured to receive a direct current (DC) power from a power supply external to the power transmitter and convert the input power to a power signal. The coil is configured to transmit the power signal to a power receiver, the coil formed of wound Litz wire and including at least one layer, the coil defining, at least, a top face. The shielding comprises a ferrite core and defines a cavity, the cavity configured such that the ferrite core substantially surrounds all but the top face of the coil.

In a refinement, if the control and communications unit determines that the power signal is non-compliant with the power request, the control and communications unit is configured to store a flag of non-compliance for the external power supply.

In a further refinement, the control and communications unit is further configured to determine if the flag of non-compliance was caused by a shut down of the power transmitter or a brown out of the power transmitter.

In yet a further refinement, if the flag of non-compliance was caused by a shut down of the power transmitter, then the power transmitter is restarted.

In another further refinement, if the flag of non-compliance was caused by a brown out of the power transmitter, then the control and communications unit is further configured to provide a reduced power request to the external power supply, determine if the a reduced power signal at the coil is compliant with the power request, and, if the power signal is compliant with the reduced power signal, continue to operate for wireless power transmission at a reduced power level.

In yet a further refinement, if the control and communications unit determines that the reduced power signal is non-compliant with the reduced power request, the control and communications unit is configured to restart the power transmitter.

In a refinement, the control and communications unit is further configured to receive power request signals from the power receiver, and determine the power control signals based on the power request signals.

In a refinement, the control and communications unit is configured to provide the power control signals to the power supply external to the power transmitter, and the power supply is configured to configure an input DC power to generate the DC power supplied based on the power control signals, and provide the DC power the inverter circuit.

In a further refinement, the power supply includes a voltage regulator, and a power supply controller configured to receive the power control signals, generate voltage regulation instructions for altering a DC voltage of the DC power, based on the power control signals, and provide the voltage regulation instructions to the voltage regulator to control the DC voltage of the DC power.

In yet a further refinement, the voltage regulation instructions include voltage step up instructions or voltage step down instructions for the voltage regulator, the voltage step up instructions and voltage step down instructions having a step level, the step level being a change in voltage at which the voltage regulator is configured to step up or step down the DC voltage of the DC power.

In yet a further refinement, the step level is in a range of about 10 millivolts (mV) to about 500 mV.

In another further refinement, the step level is about 200 mV.

In a refinement, the power signal is an alternating current (AC) power signal having a root mean square voltage, wherein the control and communications circuit is configured to generate a pulse width modulation signal for configuring an alternating current (AC) frequency for the power signal, at the operating frequency, the pulse width modulation signals modified by a duty cycle alteration, the duty cycle alteration configured to decrease the root mean square voltage of the power signal.

In a further refinement, the output power has a root mean square voltage, the root mean square voltage being less than the stepped up or stepped down DC voltage.

In accordance with another aspect of the disclosure, a power transmitter for wireless power transfer is disclosed. The base station is configured for power transfer at an operating frequency selected from a range of about 87 kilohertz (kHz) to about 205 kHz and includes a control and communications unit, an inverter circuit, a coil, and a shielding. The control and communications unit is configured to provide power control signals to control a power level of a power signal configured for transmission to a power receiver, provide a power request to an external power supply, determine if a power signal at the coil is compliant with the power request, and, if the power signal at the coil is compliant with the power request, continue to operate for wireless power transmission. The inverter circuit is configured to receive a direct current (DC) power from a power supply external to the power transmitter and convert the input power to a power signal. The coil is configured to transmit the power signal to a power receiver, the coil formed of wound Litz wire and including at least one layer, the coil defining, at least, a top face. The shielding comprises a ferrite core and defines a cavity, the cavity configured such that the ferrite core substantially surrounds all but the top face of the coil.

In a refinement, he shielding is an E-Core type shielding and the cavity is configured in an E-shape configuration.

In a refinement, if the control and communications unit determines that the power signal is non-compliant with the power request, the control and communications unit is configured to store a flag of non-compliance for the external power supply.

In a further refinement, the control and communications unit is further configured to determine if the flag of non-compliance was caused by a shut down of the power transmitter or a brown out of the power transmitter.

In yet a further refinement, if the flag of non-compliance was caused by a shut down of the power transmitter, then the power transmitter is restarted.

These and other aspects and features of the present disclosure will be better understood when read in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto. Additional, different, or fewer components and methods may be included in the systems and methods.

DETAILED DESCRIPTION

In the following description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
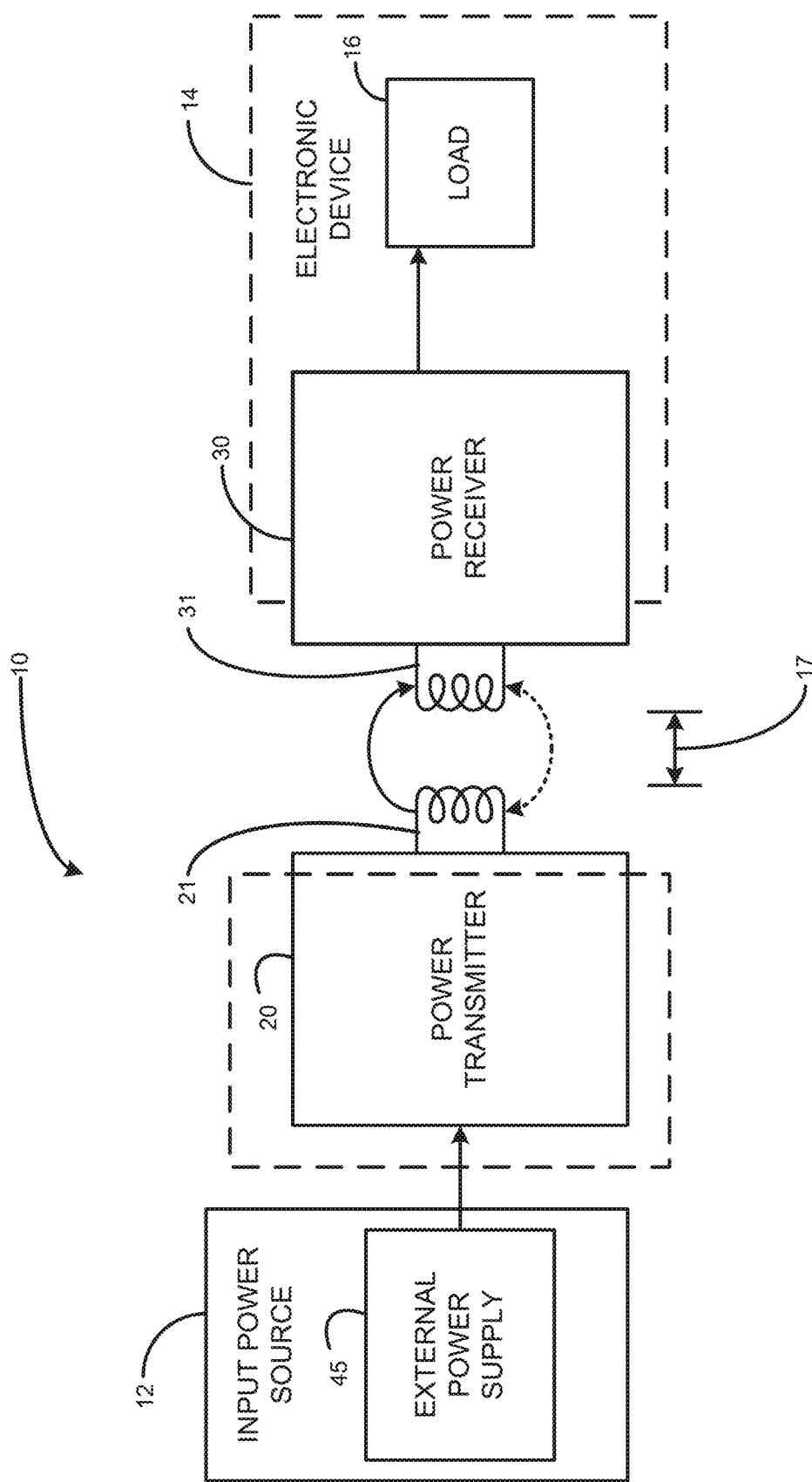
FIG. 1 is an exemplary block diagram of an embodiment of a wireless power transfer system, in accordance with an embodiment of the present disclosure.

Referring now to the drawings and with specific reference to FIG. 1, a wireless power transfer system 10 is illustrated. The wireless power transfer system 10 provides for the wireless transmission of electrical signals, such as, but not limited to, electrical energy, electrical power signals, and electromagnetic energy. Additionally, the wireless power transfer system 10 may provide for wireless transmission of electronically transmittable data ("electronic data") independent of and/or associated with the aforementioned electrical signals. Specifically, the wireless power transfer system 10 provides for the wireless transmission of electrical signals via near field magnetic coupling. As shown in the embodiment of FIG. 1, the wireless power transfer system 10 includes a power transmitter 20 and a power receiver 30. The power receiver 30 is configured to receive electrical energy, electrical power, electromagnetic energy, and/or electronic data from, at least, the power transmitter 20.

As illustrated, the power transmitter 20 and power receiver 30 may be configured to transmit electrical energy, via transmitter antenna 21 and receiver antenna 31, electrical power, electromagnetic energy, and/or electronically transmittable data across, at least, a separation distance or gap 17. A separation distance or gap, such as the gap 17, in the context of a wireless power transfer system, such as the system 10, does not include a physical connection, such as a wired connection. There may be intermediary objects located in a separation distance or gap, such as the gap 17, such as, but not limited to, air, a counter top, a casing for an electronic device, a grip device for a mobile device, a plastic filament, an insulator, a mechanical wall, among other things; however, there is no physical, electrical connection at such a separation distance or gap.

The combination of the power transmitter 20 and the power receiver 30 create an electrical connection without the need for a physical connection. "Electrical connection," as defined herein, refers to any facilitation of a transfer of an electrical current, voltage, and/or power from a first location, device, component, and/or source to a second location, device, component, and/or destination. An "electrical connection" may be a physical connection, such as, but not limited to, a wire, a trace, a via, among other physical electrical connections, connecting a first location, device, component, and/or source to a second location, device, component, and/or destination. Additionally or alternatively, an "electrical connection" may be a wireless electrical connection, such as, but not limited to, magnetic, electromagnetic, resonant, and/or inductive field, among other wireless electrical connections, connecting a first location, device, component, and/or source to a second location, device, component, and/or destination.

Alternatively, the gap 17 may be referenced as a "Z-Distance," because, if one considers an antenna 21, 31 to be disposed substantially along a common X-Y plane, then the distance separating the antennas 21, 31 is the gap in a "Z" or "depth" direction. However, flexible and/or non-planar coils are certainly contemplated by embodiments of the present disclosure and, thus, it is contemplated that the gap 17 may not be uniform, across an envelope of connection distances between the antennas 21, 31. It is contemplated that various tunings, configurations, and/or other parameters may alter the possible maximum distance of the gap 17, such that electrical transmission from the power transmitter 20 to the power receiver 30 remains possible.

The wireless power transfer system 10 operates when the power transmitter 20 and the power receiver 30 are coupled. As defined herein, the terms "couples," "coupled," and "coupling" generally refers to magnetic field coupling, which occurs when the energy of a transmitter and/or any components thereof and the energy of a receiver and/or any components thereof are coupled to each other through a magnetic field. Coupling of the power transmitter 20 and the power receiver 30, in the system 10, may be represented by a resonant coupling coefficient of the system 10 and, for the purposes of wireless power transfer, the coupling coefficient for the system 10 may be in the range of about 0.01 and 0.9.

The power transmitter 20 may be operatively associated with a base station 11. The base station 11 may be a device, such as a charger, that is able to provide near-field inductive power, via the power transmitter 20, to a power receiver. In some examples, the base station 11 may be configured to provide such near-field inductive power as specified in the Qi™ Wireless Power Transfer System, Power Class 0 Specification. In some such examples, the base station 11 may carry a logo to visually indicate to a user that the base station 11 complies with the Qi™ Wireless Power Transfer System, Power Class 0 Specification.

The power transmitter 20 may receive power from an input power source 12. The base station 11 may be any electrically operated device, circuit board, electronic assembly, dedicated charging device, or any other contemplated electronic device. Example base stations 11, with which the power transmitter 20 may be associated therewith, include, but are not limited to including, a device that includes an integrated circuit, cases for wearable electronic devices, receptacles for electronic devices, a portable computing device, clothing configured with electronics, storage medium for electronic devices, charging apparatus for one or multiple electronic devices, dedicated electrical charging devices, activity or sport related equipment, goods, and/or data collection devices, among other contemplated electronic devices.

The input power source 12 may be or may include one or more electrical storage devices, such as an electrochemical cell, a battery pack, and/or a capacitor, among other storage devices. Additionally or alternatively, the input power source 12 may be any electrical input source (e.g., any alternating current (AC) or direct current (DC) delivery port) and may include connection apparatus from said electrical input source to the wireless transmission system 20 (e.g., transformers, regulators, conductive conduits, traces, wires, or equipment, goods, computer, camera, mobile phone, and/or other electrical device connection ports and/or adaptors, such as but not limited to USB or lighting ports and/or adaptors, among other contemplated electrical components). Further, as illustrated, the input power source 12 may include, may be implemented by, and/or may be operatively associated with, for the purpose of power distribution, an external power supply 45, which directly provides a direct current (DC) power input to the power transmitter 20. The external power supply 45 may include or comprise one or more Universal Serial Bus (USB) power supplies, Lightning power supplies, Qualcomm Quick Charge devices, USB-C power supplies, USB-PD (USB Power Delivery) power supplies, Mini-USB power supplies, proprietary power supplies, input/outputs on electronic devices (e.g., a computer, a multi device charger, an automobile console, a mobile device, a portable power supply, a battery, a generator, among known power supplies.

In some examples, the input power source 12 may have power capabilities that are unknown to the power transmitter 20. In such examples, if the wireless transmission system utilizes an input power source 12 that does not have the correct power capabilities, the power transmitter 20 may not function properly (or at all) when it is connected to such an input power source 12. Thus, as discussed in more detail below, an input power verification system may be utilized to determine if the input power source 12 is capable of providing the necessary input power to the power transmitter 20. Such verification may be useful when the input power source 12 is of a type that does not have a standardized output voltage range, current range, and/or power range, such as some devices utilizing a Qualcomm Quick Charge protocol.

Electrical energy received by the power transmitter 20 is then used for at least two purposes: providing electrical power to internal components of the power transmitter 20 and providing electrical power to the transmitter coil 21. The transmitter coil 21 is configured to wirelessly transmit the electrical signals conditioned and modified for wireless transmission by the power transmitter 20 via near-field magnetic coupling (NFMC). Near-field magnetic coupling enables the transfer of electrical energy, electrical power, electromagnetic energy, and/or electronically transmissible data wirelessly through magnetic induction between the transmitter coil 21 and a receiving coil 31 of, or associated with, the power receiver 30. Near-field magnetic coupling may enable "inductive coupling," which, as defined herein, is a wireless power transmission technique that utilizes an alternating electromagnetic field to transfer electrical energy between two or more antennas/coils. Such inductive coupling is the near field wireless transmission of electrical energy between two magnetically coupled coils that are tuned to resonate at a similar frequency. Further, such near-field magnetic coupling may provide connection via "mutual inductance," which, as defined herein is the production of an electromotive force in a circuit by a change in current in at least one circuit magnetically coupled to the first.

In one or more embodiments, the inductor coils of either the transmitter coil 21 or the receiver coil 31 are strategically positioned to facilitate reception and/or transmission of wirelessly transferred electrical energy, power, electromagnetic energy and/or data through near field magnetic induction. Antenna operating frequencies may comprise all operating frequency ranges, examples of which may include, but are not limited to, about 87 kHz to about 205 kHz (Qi™ interface standard). The operating frequencies of the coils 21, 31 may be operating frequencies designated by the International Telecommunications Union (ITU) in the Industrial, Scientific, and Medical (ISM) frequency bands.

As known to those skilled in the art, a "resonant frequency" or "resonant frequency band" refers to a frequency or frequencies wherein amplitude response of the antenna is at a relative maximum, or, additionally or alternatively, the frequency or frequency band where the capacitive reactance has a magnitude substantially similar to the magnitude of the inductive reactance. In one or more embodiments the transmitting antenna resonant frequency band extends from about 87 kHz to about 360 kHz. In one or more embodiments the inductor coil of the receiver coil 31 is configured to resonate at a receiving antenna resonant frequency or within a receiving antenna resonant frequency band.

In some examples, the transmitting coil and the receiving coil of the present disclosure may be configured to transmit and/or receive electrical power at a baseline power profile having a magnitude up to about 5 watts (W). In some other examples, the transmitting coil and the receiving coil of the present disclosure may be configured to transmit and/or receive electrical power at an extended power profile, supporting transfer of up to 25 W of power.

The power receiver 30 is configured to acquire near-field inductive power from the power transmitter 20. In some examples, the power receiver 30 is a subsystem of an electronic device 14. The electronic device 14 may be any device that is able to consume near field inductive power as specified in the Qi™ Wireless Power Transfer System, Power Class 0 Specification. In some such examples, the electronic device 14 may carry a logo to visually indicate to a user that the electronic device 14 complies with the Specification.

The electronic device 14 may be any device that requires electrical power for any function and/or for power storage (e.g., via a battery and/or capacitor). Additionally or alternatively, the electronic device 14 may be any device capable of receipt of electronically transmissible data. For example, the device may be, but is not limited to being, a handheld computing device, a mobile device, a portable appliance, an integrated circuit, an identifiable tag, a kitchen utility device, an automotive device, an electronic tool, an electric vehicle, a game console, a robotic device, a wearable electronic device (e.g., an electronic watch, electronically modified glasses, altered-reality (AR) glasses, virtual reality (VR) glasses, among other things), a portable scanning device, a portable identifying device, a sporting good, an embedded sensor, an Internet of Things (IoT) sensor, IoT enabled clothing, IoT enabled recreational equipment, industrial equipment, medical equipment, a medical device, a tablet computing device, a portable control device, a remote controller for an electronic device, a gaming controller, among other things.

For the purposes of illustrating the features and characteristics of the disclosed embodiments, arrow-ended lines are utilized to illustrate transferrable and/or communicative signals and various patterns are used to illustrate electrical signals that are intended for power transmission and electrical signals that are intended for the transmission of data and/or control instructions. Solid lines indicate signal transmission of electrical energy, electrical power signals, and/or electromagnetic energy over a physical and/or wireless electrical connection, in the form of power signals that are, ultimately, utilized in wireless power transmission from the power transmitter 20 to the power receiver 30. Further, dotted lines are utilized to illustrate electronically transmittable data signals, which ultimately may be wirelessly transmitted from the power transmitter 20 to the power receiver 30.

Figure 2:
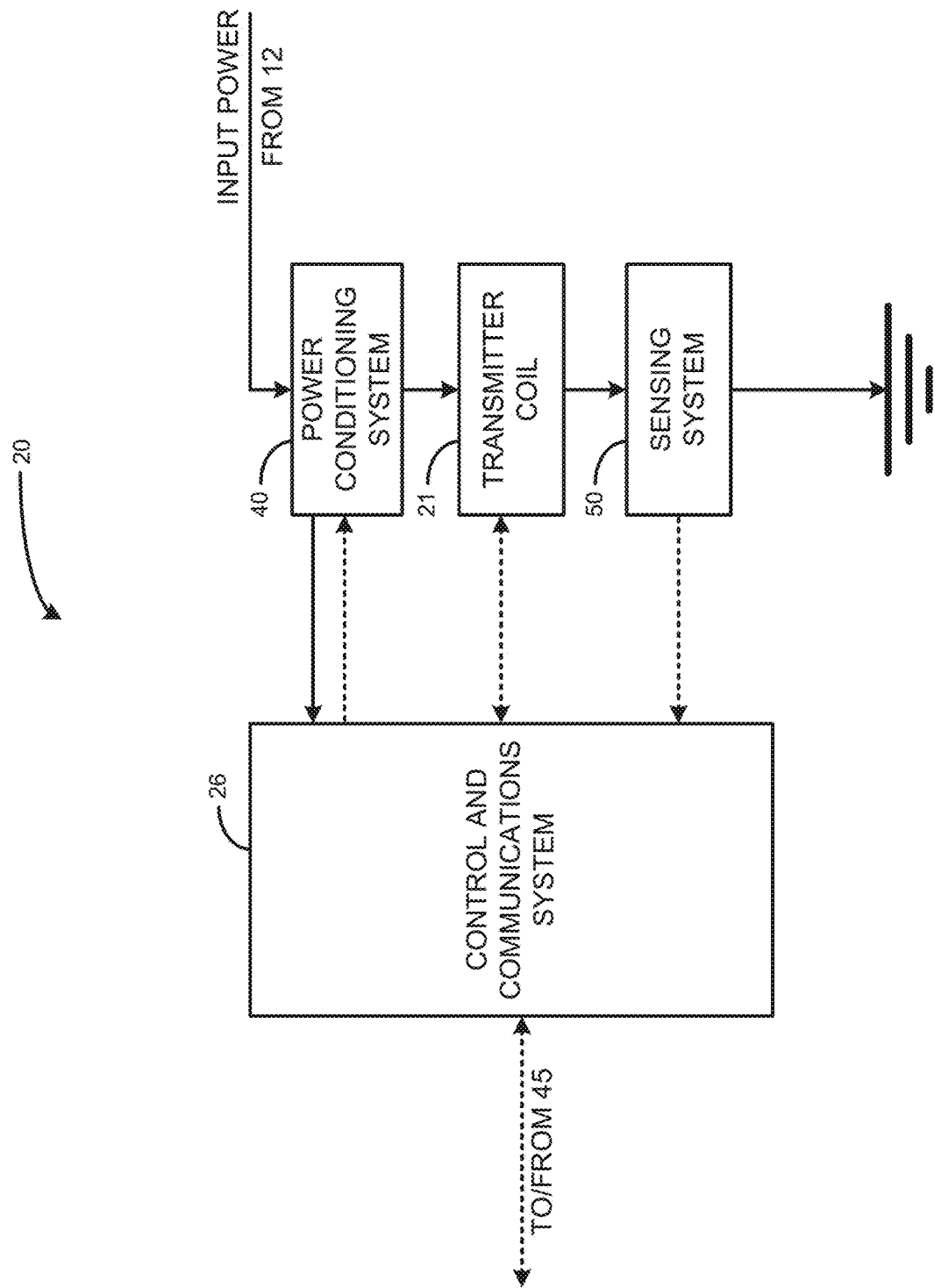
FIG. 2 is an exemplary block diagram for a power transmitter, which may be used in conjunction with the wireless power transfer system of FIG. 1, in accordance with FIG. 1 and an embodiment of the present disclosure.

Turning now to FIG. 2, the wireless power transfer system 10 is illustrated as a block diagram including example sub-systems of the power transmitter 20. The wireless transmission system 20 may include, at least, a power conditioning system 40, a control and communications system 26, a sensing system 50, and the transmission coil 21. The electrical energy input from the input power source 12, via the external power supply 45, is conditioned and/or modified for wireless power transmission, to the power receiver 30, via the transmission coil 21. Accordingly, the second portion of the input energy is modified and/or conditioned by the power conditioning system 40.

The control and communications system 26, generally, comprises digital logic portions of the power transmitter 20. The control and communications system 26 receives and decodes messages from the power receiver 30, executes the relevant power control algorithms and protocols, and drives the frequency of the AC waveform to control the power transfer. As discussed in greater detail below, the control and communications system 26 also interfaces with other subsystems of the power transmitter 20. For example, the control and communications system 26 may interface with other elements of the power transmitter 20 for user interface purposes.

Figure 3:
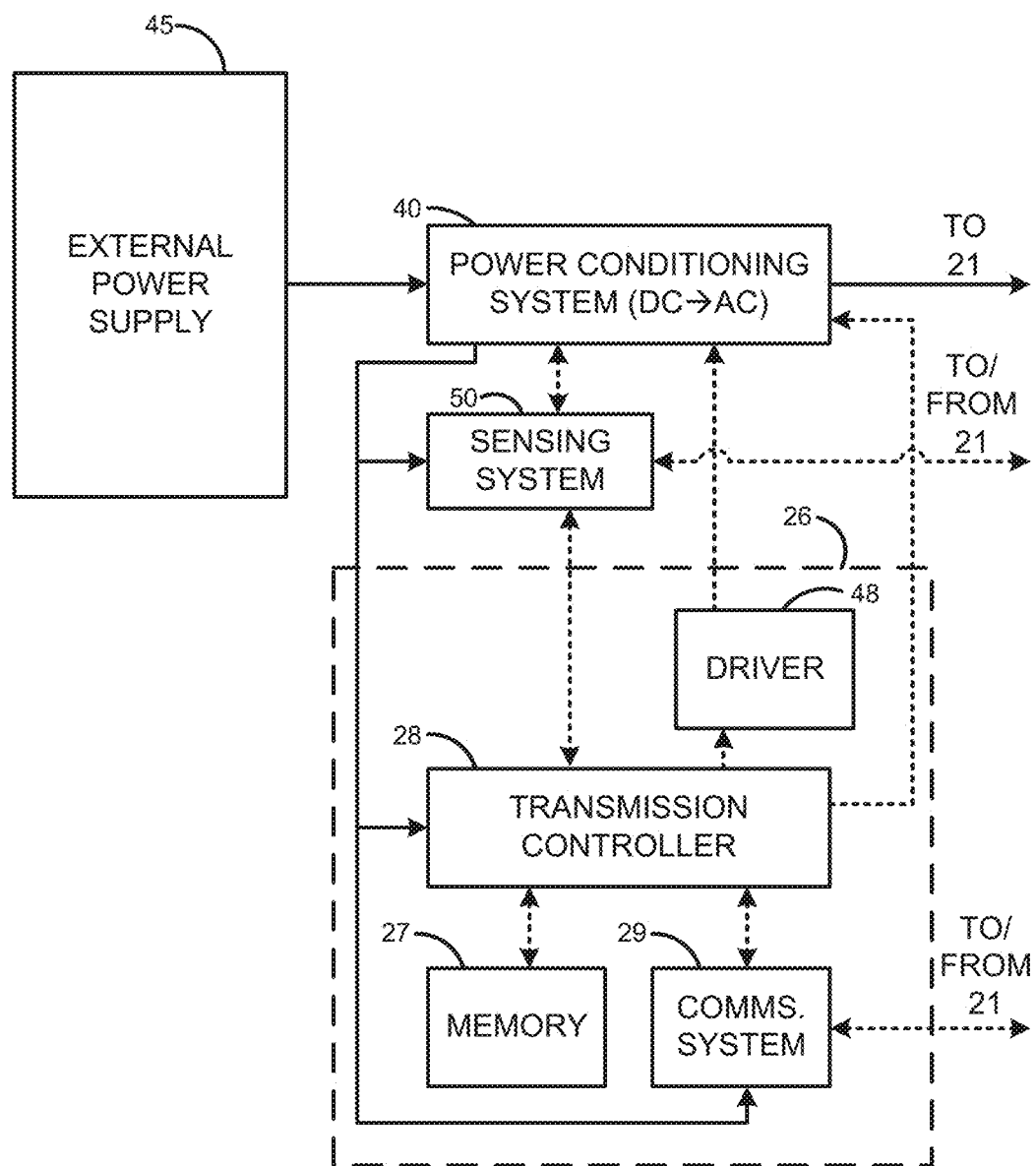
FIG. 3 is an exemplary block diagram for components of a control and communications system of the power transmitter of FIG. 2, in accordance with FIGS. 1-2 and an embodiment of the present disclosure.

Referring now to FIG. 3, with continued reference to FIGS. 1 and 2, subcomponents and/or systems of the control and communications system 26 are illustrated. The control and communications system 26 may include a transmission controller 28, a communications system 29, a driver 48, and a memory 27.

The transmission controller 28 may be any electronic controller or computing system that includes, at least, a processor which performs operations, executes control algorithms, stores data, retrieves data, gathers data, controls and/or provides communication with other components and/or subsystems associated with the power transmitter 20, and/or performs any other computing or controlling task desired. The transmission controller 28 may be a single controller or may include more than one controller disposed to control various functions and/or features of the power transmitter 20 such as, but not limited to, providing control instructions to the external power supply 45. Functionality of the transmission controller 28 may be implemented in hardware and/or software and may rely on one or more data maps relating to the operation of the power transmitter 20. To that end, the transmission controller 28 may be operatively associated with the memory 27. The memory may include one or more of internal memory, external memory, and/or remote memory (e.g., a database and/or server operatively connected to the transmission controller 28 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory machine readable and/or computer readable memory media.

While particular elements of the control and communications system 26 are illustrated as independent components and/or circuits (e.g., the driver 48, the memory 27, the communications system 29, among other contemplated elements) of the control and communications system 26, such components may be integrated with the transmission controller 28. In some examples, the transmission controller 28 may be an integrated circuit configured to include functional elements of one or both of the transmission controller 28 and the power transmitter 20, generally.

As illustrated, the transmission controller 28 is in operative association, for the purposes of data transmission, receipt, and/or communication, with, at least, the memory 27, the communications system 29, the power conditioning system 40, the driver 48, and the sensing system 50. The driver 48 may be implemented to control, at least in part, the operation of the power conditioning system 40. In some examples, the driver 48 may receive instructions from the transmission controller 28 to output a generated pulse width modulation (PWM) signal to the power conditioning system 40. In some such examples, the PWM signal may be configured to drive the power conditioning system 40 to output electrical power as an alternating current signal, having an operating frequency defined by the PWM signal. As discussed in greater detail below with reference to FIGS. 6-7B, the PWM signal may be altered by the controller 28, for, at least, power control purposes.

The sensing system 50 may include one or more sensors, wherein each sensor may be operatively associated with one or more components of the power transmitter 20 and configured to provide information and/or data. The term "sensor" is used in its broadest interpretation to define one or more components operatively associated with the power transmitter 20 that operate to sense functions, conditions, electrical characteristics, operations, and/or operating characteristics of one or more of the power transmitter 20, the power receiver 30, the input power source 12, the base station 11, the transmission coil 21, the receiver coil 31, along with any other components and/or subcomponents thereof.

Figure 4:
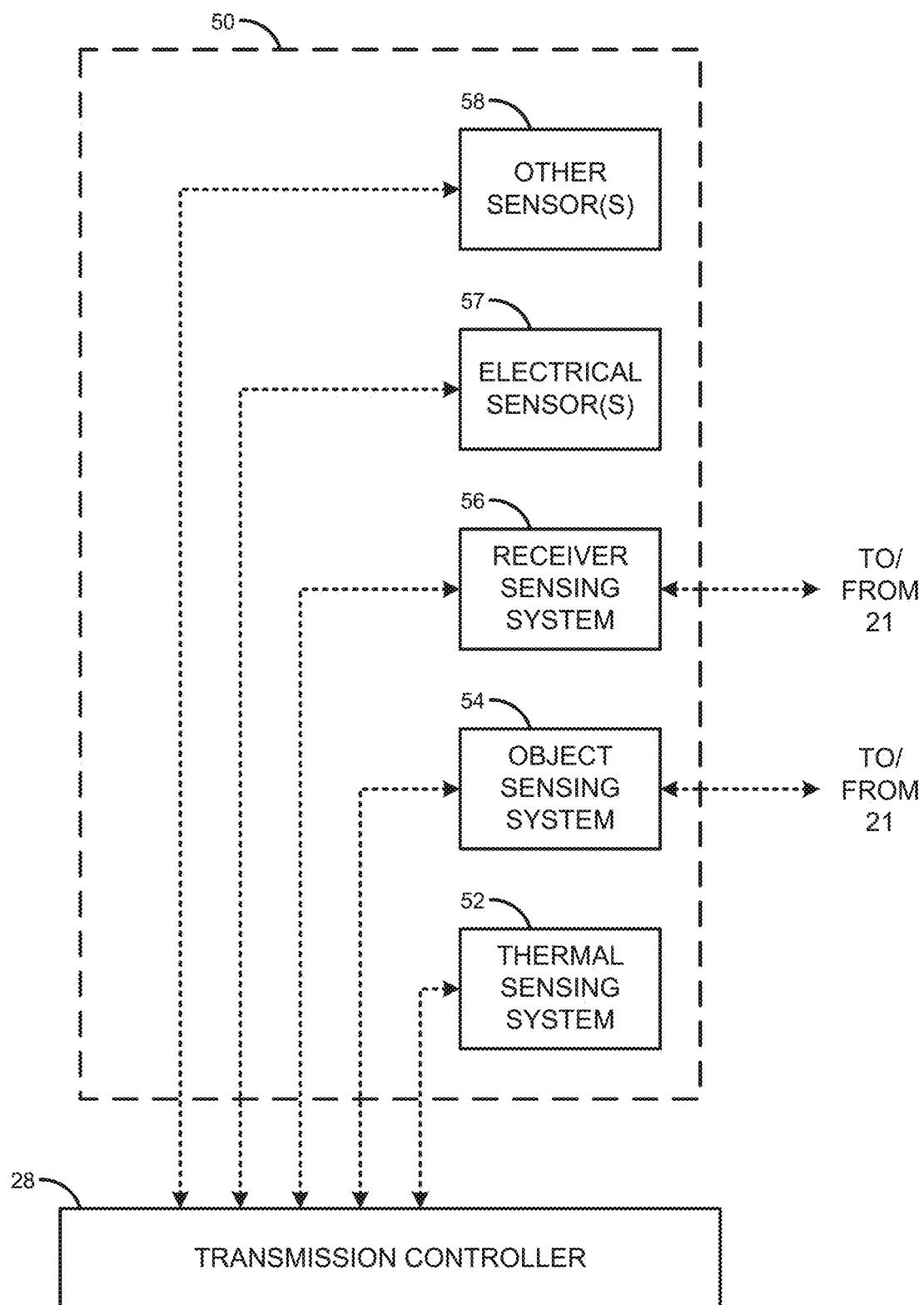
FIG. 4 is an exemplary block diagram for components of a sensing system of the control and communications system of FIG. 3, in accordance with FIGS. 1-3 and an embodiment of the present disclosure.

As illustrated in the embodiment of FIG. 4, the sensing system 50 may include, but is not limited to including, a thermal sensing system 52, an object sensing system 54, a receiver sensing system 56, electrical sensor(s) 57 and/or any other sensor(s) 58. Within these systems, there may exist even more specific optional additional or alternative sensing systems addressing particular sensing aspects required by an application, such as, but not limited to: a condition-based maintenance sensing system, a performance optimization sensing system, a state-of-charge sensing system, a temperature management sensing system, a component heating sensing system, an IoT sensing system, an energy and/or power management sensing system, an impact detection sensing system, an electrical status sensing system, a speed detection sensing system, a device health sensing system, among others. The object sensing system 54, may be a foreign object detection (FOD) system.

Each of the thermal sensing system 52, the object sensing system 54, the receiver sensing system 56 and/or the other sensor(s) 58, including the optional additional or alternative systems, are operatively and/or communicatively connected to the transmission controller 28. The thermal sensing system 52 is configured to monitor ambient and/or component temperatures within the power transmitter 20 or other elements nearby the power transmitter 20. The thermal sensing system 52 may be configured to detect a temperature within the power transmitter 20 and, if the detected temperature exceeds a threshold temperature, the transmission controller 28 prevents the power transmitter 20 from operating. Such a threshold temperature may be configured for safety considerations, operational considerations, efficiency considerations, and/or any combinations thereof. In a non-limiting example, if, via input from the thermal sensing system 52, the transmission controller 28 determines that the temperature within the power transmitter 20 has increased from an acceptable operating temperature to an undesired operating temperature (e.g., in a non-limiting example, the internal temperature increasing from about 20° Celsius (C) to about 50° C., the transmission controller 28 prevents the operation of the power transmitter 20 and/or reduces levels of power output from the power transmitter 20. In some non-limiting examples, the thermal sensing system 52 may include one or more of a thermocouple, a thermistor, a negative temperature coefficient (NTC) resistor, a resistance temperature detector (RTD), and/or any combinations thereof.

As depicted in FIG. 4, the transmission sensing system 50 may include the object sensing system 54. The object sensing system 54 may be configured to detect presence of unwanted objects in contact with or proximate to the power transmitter 20. In some examples, the object sensing system 54 is configured to detect the presence of an undesired object. In some such examples, if the transmission controller 28, via information provided by the object sensing system 54, detects the presence of an undesired object, then the transmission controller 28 prevents or otherwise modifies operation of the power transmitter 20. In some examples, the object sensing system 54 utilizes an impedance change detection scheme, in which the transmission controller 28 analyzes a change in electrical impedance observed by the transmission coil 21 against a known, acceptable electrical impedance value or range of electrical impedance values. Additionally or alternatively, in some examples the object sensing system 54 may determine if a foreign object is present by measuring power output associated with the power transmitter 20 and determining power input associated with a receiver associated with the power transmitter 20. In such examples, the object sensing system 54 may calculate a difference between the power associated with the power transmitter 20 and the power associated with the receiver and determine if the difference indicates a loss, consistent with a foreign object not designated for wireless power transmission.

Additionally or alternatively, the object sensing system 54 may utilize a quality factor (Q) change detection scheme, in which the transmission controller 28 analyzes a change from a known quality factor value or range of quality factor values of the object being detected, such as the receiver coil 31. The "quality factor" or "Q" of an inductor can be defined as (frequency (Hz)×inductance (H))/resistance (ohms), where frequency is the operational frequency of the circuit, inductance is the inductance output of the inductor and resistance is the combination of the radiative and reactive resistances that are internal to the inductor. "Quality factor," as defined herein, is generally accepted as an index (figure of measure) that measures the efficiency of an apparatus like an antenna, a circuit, or a resonator. In some examples, the object sensing system 54 may include one or more of an optical sensor, an electro-optical sensor, a Hall effect sensor, a proximity sensor, and/or any combinations thereof.

The receiver sensing system 56 is any sensor, circuit, and/or combinations thereof configured to detect presence of any wireless receiving system that may be couplable with the power transmitter 20. In some examples, if the presence of any such wireless receiving system is detected, wireless transmission of electrical energy, electrical power, electromagnetic energy, and/or data by the power transmitter to said wireless receiving system is enabled. In some examples, if the presence of a wireless receiver system is not detected, wireless transmission of electrical energy, electrical power, electromagnetic energy, and/or data is prevented from occurring. Accordingly, the receiver sensing system 56 may include one or more sensors and/or may be operatively associated with one or more sensors that are configured to analyze electrical characteristics within an environment of or proximate to the power transmitter 20 and, based on the electrical characteristics, determine presence of a power receiver 30.

The electrical sensor(s) 57 may include any sensors configured for detecting and/or measuring any current, voltage, and/or power within the power transmitter 20. Information provided by the electrical sensor(s) 57, to the transmission controller 28, may be utilized independently and/or in conjunction with any information provided to the transmission controller 28 by one or more of the thermal sensing system 52, the object sensing system 54, the receiver sensing system 56, the other sensor(s) 58, and any combinations thereof.

Figure 5:
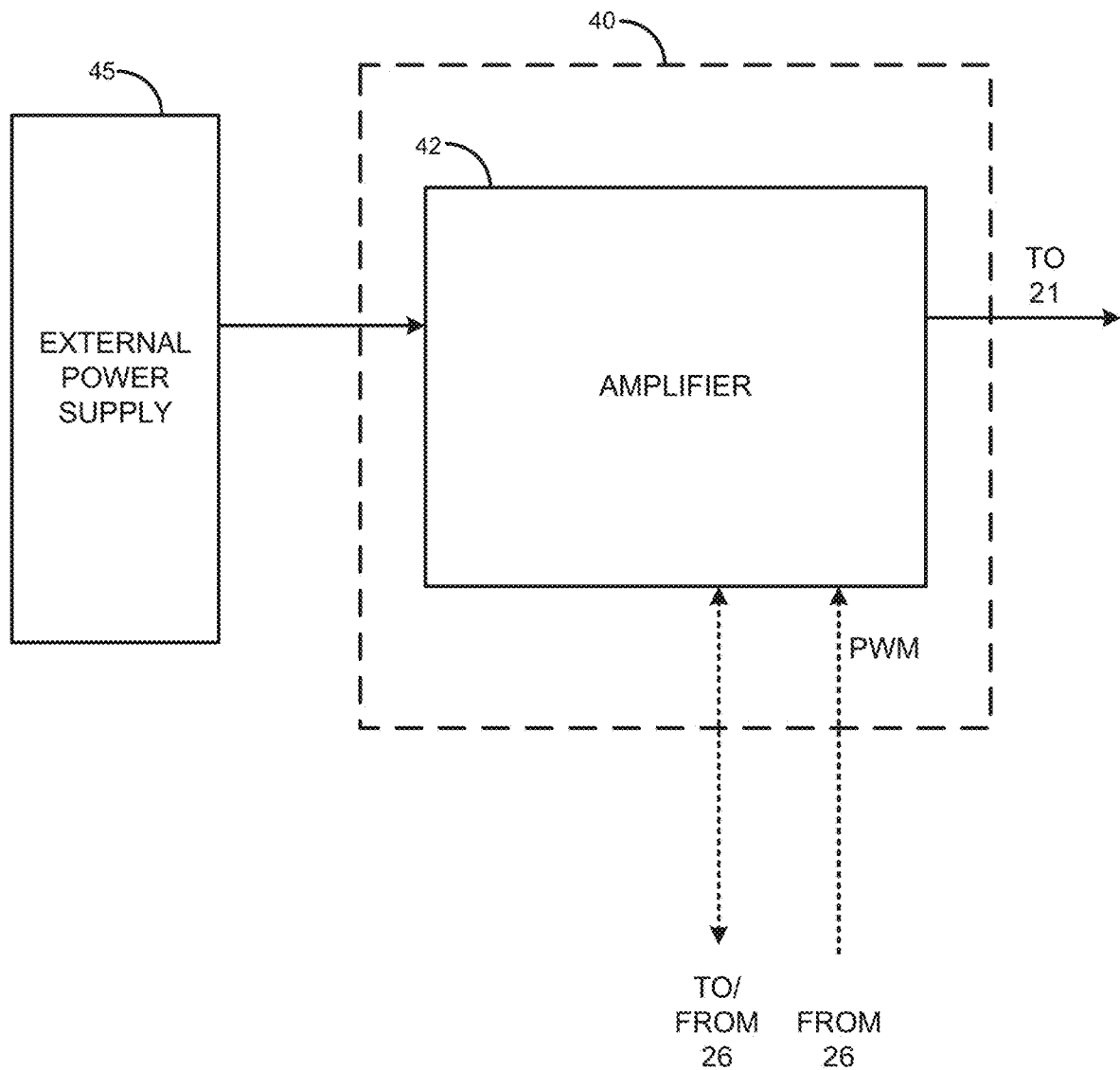
FIG. 5 is an exemplary block diagram for components of a power conditioning system of the power transmitter of FIGS. 1-2, in accordance with FIGS. 1-2 and an embodiment of the present disclosure.

Referring now to FIG. 5, and with continued reference to FIGS. 1-4, a block diagram illustrating an embodiment of the power conditioning system 40 is illustrated. At the power conditioning system 40, electrical power is received, generally, as a DC power source, via the external power supply 45. The electrical power is provided to an amplifier 42 of the power conditioning system 40, which is configured to condition the electrical power for wireless transmission by the coil 21. The amplifier 42 may function as an inverter, which receives a DC power signal from the external power supply 45 and generates an AC power signal as output, based, at least in part, on PWM input from the transmission control system 26. The amplifier 42 may be or include, for example, a power stage inverter. The use of the amplifier 42 within the power conditioning system 40 and, in turn, the power transmitter 20 enables wireless transmission of electrical signals having much greater amplitudes than if transmitted without such an amplifier. For example, the addition of the amplifier 42 may enable the wireless transmission system 20 to transmit electrical energy as an electrical power signal having electrical power from about 10 milliwatts (mW) to about 60 W.

Figure 6A:
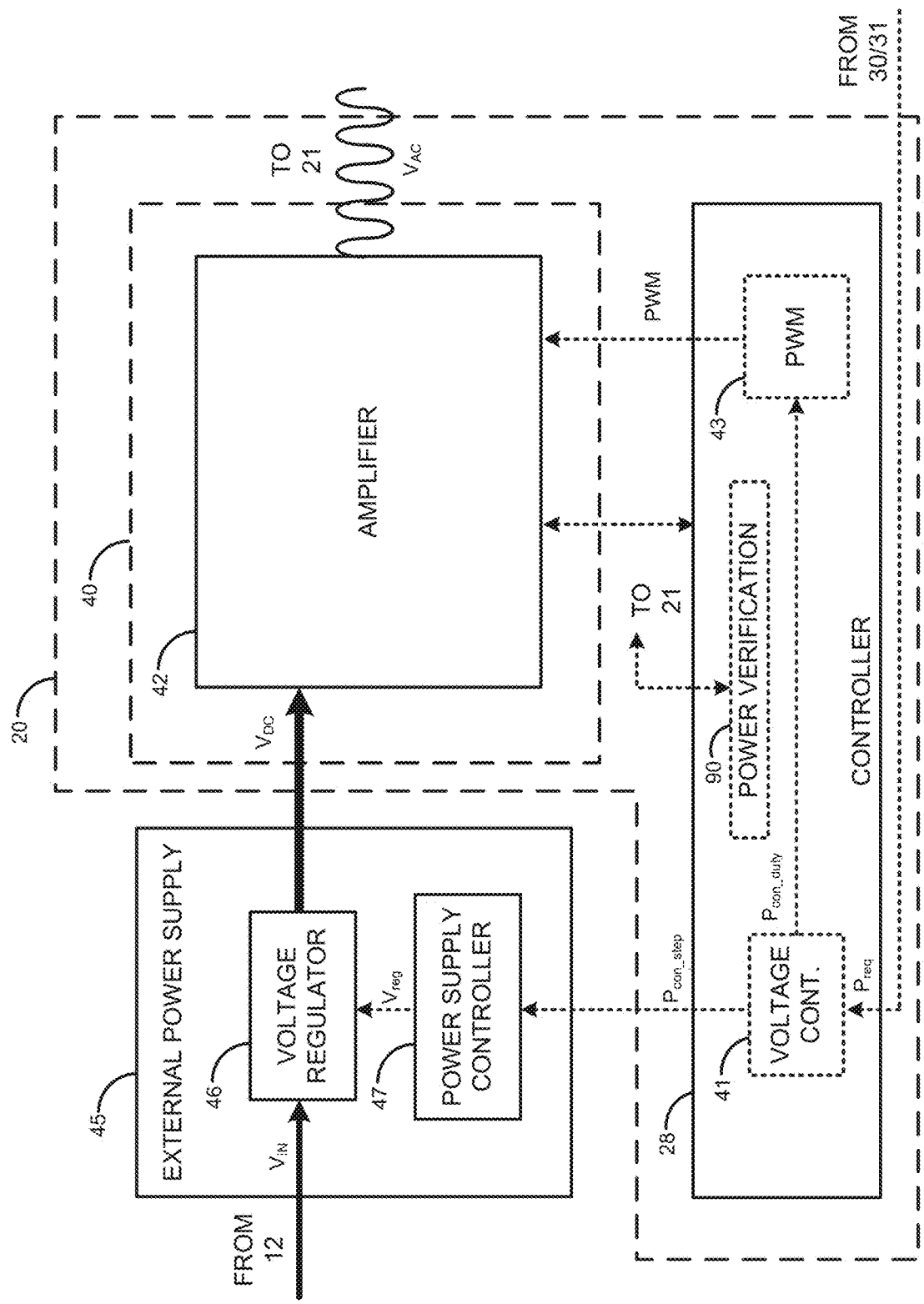
FIG. 6A is an exemplary block diagram for components of the power transmitter of FIGS. 1-5 and an external power supply of the wireless power transfer system of FIG. 1, in accordance with FIGS. 1-5 and the present disclosure.
Figure 6B:
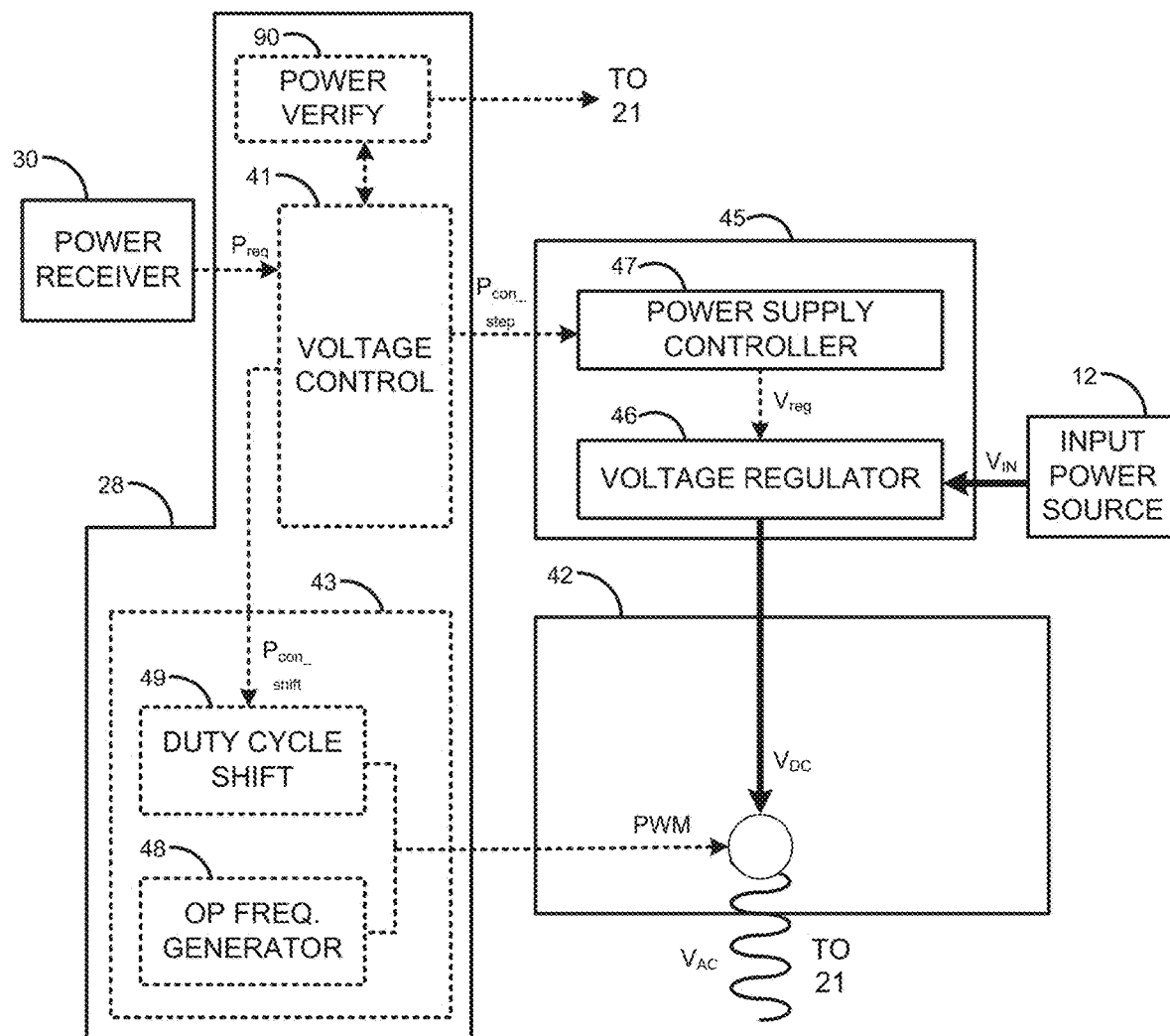
FIG. 6B is an exemplary block diagram illustrating similar components of the power transmitter as those of FIG. 6A, but further illustrating a duty cycle shift in the process of generating a power signal, in accordance with FIGS. 1-6A and the present disclosure.

Turning now to FIGS. 6A and 6B, with continued reference to FIGS. 1-5, components of the power transmitter 20 and the external power supply 45 are illustrated, for the purposes of describing power control methods, schemes, and/or components of the power transmitter 20. To that end, the block diagram of FIG. 6A illustrates interaction between one or more of the power conditioning system 40, the amplifier 42, the controller 28, the external power supply 45, or components thereof.

The external power supply 45, as discussed above, may be any suitable power supply, which is configurable for providing a proper DC power signal ($V_{DC}$), at a DC voltage, to the amplifier 42. The DC power is conditioned for wireless power transmission as an alternating current (AC) power signal ($V_{AC}$), via the transmitter antenna 21. In some examples, the external power supply 45 may provide $V_{DC}$ directly to the amplifier 42, absent any additional voltage step up or down via physical electrical components (e.g., an internal DC/DC converter of the power transmitter 20). However, while not utilizing hardware internal to the power transmitter to alter $V_{DC}$, it is certainly contemplated, as discussed below, that voltage, current, and/or power levels of the resultant power signal $V_{AC}$ may be altered by control via the controller 28.

The external power supply 45 receives an input power $V_{IN}$, which may be any DC or AC input power from the input power source 12, to be conditioned by the external power supply 45, for output directly to the amplifier 42 as $V_{DC}$. A voltage regulator 46 receives $V_{IN}$ from the input power source 12 and is configured to provide electrical power to the amplifier 42. Accordingly, the voltage regulator 46 is configured to convert the received electrical power into a power signal at a proper voltage for operation of the respective downstream components. The voltage regulator 46 may be any voltage regulator known in the art that is capable of converting in input voltage to an output, direct current voltage, which may include one or more DC/DC converters, amplifiers, transistors, transformers, inverters, switches, diodes, rectifiers, switching systems, among other known voltage regulators. To that end, the voltage regulator 46 may be configured to step up $V_{IN}$ to result in $V_{DC}$, step down $V_{IN}$ to result in $V_{DC}$, and/or maintain a substantially similar voltage $V_{IN}$ to result in $V_{DC}$.

Such stepping up, stepping down, and/or maintenance of the voltage for generating $V_{DC}$ may be controlled by a power supply controller 47 of the external power supply 45. The power supply controller 47 may include any internal firmware and/or may respond to signals from any external controllers (e.g., the transmission controller 28) for determining instructions for provision to the voltage regulator 46, to control voltage levels for the resultant $V_{DC}$. As discussed in more detail below, one or more control methods, schemes, and/or components are utilized by the power supply controller 47 to output the desired $V_{DC}$ directly to the amplifier 42.

The power supply controller 47 may be any electronic controller or computing system that includes, at least, a processor which performs operations, executes control algorithms, stores data, retrieves data, gathers data, controls and/or provides communication with other components and/or subsystems associated with external power supply 45, and/or performs any other computing or controlling task desired. The power supply controller 47 may be a single controller or may include more than one controller disposed to control various functions and/or features of the external power supply 45. Functionality of the power supply controller 47 may be implemented in hardware and/or software and may rely on one or more data maps relating to the operation of the external power supply 45. To that end, the power supply controller 47 may be operatively associated with memory. The memory may include one or more of internal memory, external memory, and/or remote memory (e.g., a database and/or server operatively connected to the power supply controller 47 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory machine readable and/or computer readable memory media. In some examples, power supply controller 47 may be an integrated circuit configured to include functional elements of one or both of the power supply controller 47 and the external power supply 45, generally.

As illustrated in FIGS. 6, the transmission controller 28 may be utilized for communications with one or more of the external power supply 45, the power supply controller 47, or the amplifier 42, for controlling power levels of power signals within the power transmitter 20. Particularly, the transmission controller 28 is configured to provide power control signals ($P_{con}$) to control a power level of the power signal $V_{AC}$, $V_{AC}$ configured for transmission to the power receiver 30. For controlling voltages of one or more of $V_{AC}$, $V_{DC}$, or any intervening power signals of the power transmitter 20, the transmitter controller 28 may include, implement, execute firmware to implement, and/or functionally provide a voltage controller 41 and a pulse-width modulation signal (PWM) generator 43.

The voltage controller 41 is, generally, configured to provide one or both of control instructions for stepping up or stepping down the DC power signal $V_{DC}$ or altering power levels of the AC power signal $V_{AC}$. Further, to determine the power control signals ($P_{con}$), the voltage controller may be configured to receive power request signals ($P_{req}$) from the power receiver 30 and determine $P_{con}$ based, at least in part, on $P_{req}$. $P_{req}$ may be any information that determines a desired power level for transmission to the power receiver 30, such as, but not limited to, a current charge level of a load associated with the power receiver 30, a voltage at a rectifier of the power receiver 30, a load resistance associated with the power receiver 30, among other electrical information associated with the power receiver 30.

For controlling voltage levels of $V_{DC}$, upon input to the amplifier 42, from the external power supply 45, the transmitter controller 28 is configured to provide $P_{con}$, at least in part, to the external power supply 45, such that the power supply may utilize information of $P_{con}$ to configure $V_{DC}$ based, at least in part, on $V_{IN}$ and $P_{con}$, and provide $V_{DC}$ to the amplifier 42. In some such examples, such as those illustrated in FIG. 6A, the power supply controller 47 is configured to receive $P_{con}$, at least in part, and generate voltage regulation instructions ($V_{reg}$), $V_{reg}$ configured for altering the DC voltage of $V_{DC}$, based on $P_{con}$. The power supply controller 47 provides $V_{reg}$ to the voltage regulator 46, for the voltage regulator 46 to regulate and/or control levels of the DC voltage of $V_{DC}$, prior to input to the amplifier 42.

In some examples, information of $P_{con}$ transmitted to the power supply controller 47 may include voltage step up instructions and/or voltage step down instructions ($P_{con\_step}$). $P_{con\_step}$ includes a step level, which is a level, step magnitude, and/or change in voltage at which the voltage regulator 46 and/or the power supply controller 47 is configured to step up or step down the DC voltage of $V_{DC}$, when configuring $V_{DC}$ from $V_{IN}$. In some examples, the step levels may be proprietary, with specific voltage levels configured for operation of specific devices and/or operations. In some other examples, the step levels may be a constant rate of change in voltage, from which the power supply 45 is configured to any power level that is a multiple of the step level, up to an upper-bound maximum output power. Utilizing small step levels may allow for greater precision in power control, by the power transmitter 20, utilizing external power regulation of the external power supply 45. For example, the step level may be in a range of about 10 millivolts (mV) to about 500 mV. In some other examples, the step level may be about 200 mV. Utilizing step levels in control of an external power supply 45 may allow for the power transmitter 20 to effectively utilize off-the-shelf, inexpensive power supplies, in place of more costly internal voltage regulation hardware. As discussed in more detail below, a power verification 90 system or method may be utilized by the controller 28 to determine if the external power supply 45 is capable of providing input power, with sufficient voltage, current, and/or power, to the power transmitter 20, for proper functionality of the wireless power transmitter 20.

Turning now to FIG. 6B, the PWM generator 43 may be utilized for providing a PWM signal to the amplifier, for forming $V_{AC}$ based, at least in part, on the input $V_{DC}$ of the amplifier 42. The PWM generator 43 may generate the PWM signal based, at least, on an operating frequency provided by the operating frequency generator 48. In some examples, the operating frequency produced by the operating frequency generator 48 may be selected from a range of about 87 kHz to about 205 kHz.

In some examples, the PWM generator further includes a duty cycle shift 49, which may be configured to shift, alter, and/or otherwise configure a duty cycle of the resultant AC power signal $V_{AC}$, which is generated based, at least in part, on the PWM signal (PWM). A duty cycle, as defined herein, refers to the positive voltage cycle of a period of an AC power signal. In an exemplary, ideal, sinusoidal waveform for the AC power signal $V_{AC}$, the initial duty cycle of $V_{AC}$ is about 50% of the period of the sinusoidal waveform. Thus, if the duty cycle of $V_{AC}$ is decreased, the effective amount of power, over a period of time, will be less than the amount of power output, over a period of time, of an unaltered, about 50% duty cycle for the ideal sinusoidal waveform.

Figure 6C:
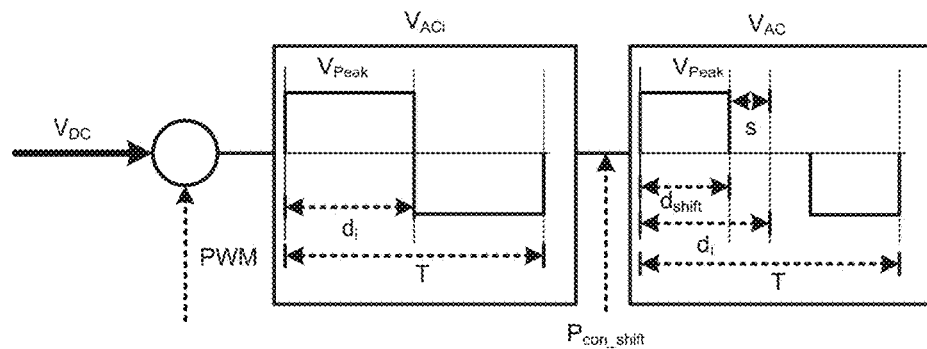
FIG. 6C is an exemplary block diagram illustrating components and/or functions associated with one or more of a transmitter controller, a pulse width modulation generator, or components thereof of FIGS. 6A and 6B, in accordance with FIGS. 1-6B and the present disclosure.

For the purposes of explanation and example, FIG. 6C is provided to illustrate the effect of a duty cycle shift on the power output of the amplifier 42, based on the control systems, schemes, and/or apparatus disclosed, with respect to FIGS. 6A and 6B. As illustrated in FIGS. 6A and 6B, the power signal $V_{AC}$ is generated at the amplifier 42 based, at least in part, on both $V_{DC}$ and PWM. As illustrated in FIG. 6C, the output of the amplifier, with inputs of $V_{DC}$ and PWM, may result in a substantially sinusoidal wave form having an initial duty cycle ($d_i$) that is equal to about 50% of a period of the sinusoidal waveform (T). As illustrated, this unshifted sinusoidal power signal is an initial AC power signal ($V_{ACi}$), which has an initial root mean square voltage ($V_{ACi\_rms}$). A root mean square (rms) voltage refers to the square root of the average value of the squared function of instantaneous values for the voltage, over a period of time, for an alternating current signal. In other words, one may consider a rms voltage to refer to an equivalent DC value which tells you how many volts of voltage and/or amperes of current that a waveform is comparable to, in terms of its ability to produce the same power. As illustrated, $V_{ACi}$ has a peak voltage $V_{Peak}$, the initial duty cycle $d_i$, and a period T. If $d_i$ is shifted and $V_{Peak}$ and T remain substantially constant, then an rms voltage of the wave form will shift proportionately with the shift in duty cycle. To that end, as illustrated in FIG. 6C, if $d_i$ is shifted and/or reduced by a shift(s) and substantially maintains a constant T and $V_{Peak}$, then arms voltage of the shifted, final output $V_{AC}$, having a shifted duty cycle $d_{shift}$, will have an altered rms voltage ($V_{AC\_rms}$), when compared to $V_{ACi\_rms}$.

In some examples, the PWM generator 43 may be configured to receive duty cycle shift information ($P_{con\_shift}$), of $P_{con}$, and generate PWM as modified to generate $V_{AC}$ with a modified duty cycle, as illustrated in FIG. 6C. In such examples, the root mean square voltage $V_{AC\_rms}$, after modification, is less than $V_{ACi\_rms}$ would be, absent the duty cycle shift. Accordingly, by shifting the duty cycle of $V_{AC}$, utilizing the controller 28 and/or the PWM generator 43, precision control of the power levels output for $V_{AC}$ can be achieved through direct software and/or hardware control of a duty cycle shift for $V_{AC}$.

By utilizing the duty cycle shifting systems, methods, and/or apparatus in conjunction with the external power supply control systems methods and/or apparatus, precision power level control for an output power signal can be achieved by the power transmitter 20. Additionally, such systems, methods, and/or apparatus may allow for greater precisionity in controls and/or greater range of controls, without need to include additional and/or costly voltage regulation hardware within the power transmitter 20, itself. As discussed above, said systems, methods, and apparatus are beneficial for utilizing the power transmitter 20 with known, affordable, off-the-shelf power supply components, for cost reduction and/or bill of materials reduction.

In some examples, the transmission controller 28 may be configured to include, execute, and/or embody a power verification 90, for determining if the external power supply 45, when in electrical connection with the power transmitter 20, is capable of providing input power to the power transmitter 20 with a proper level of voltage, current, and/or power. To that end, in some examples, an external power supply may not have the granularity or capabilities to provide levels of output power, in line with the requirements of the power transmitter 20, to maintain proper wireless power transmission operations. For example, a power transmitter 20 may require that the input power from the input power supply be at about 24 W, such that the ultimate transferred power by the power transmitter 20 to the power receiver is about 15 W. Therefore, the power verification 90 may be utilized to determine if the external power supply 45 is adequate for use in operation of the power transmitter 20, by determining if the external power supply 45 can provide the power, voltage, and/or current levels to achieve the desired end-operation of the power transmitter 20 transmitting a desired power level to the power receiver 30. Such determinations are useful when, for example, a power transmitter 20 is provided to a user without a dedicated, wired input power source 12 and the user is able to plug the power transmitter 20 into a variety of external power supplies 45.

Figure 6D:
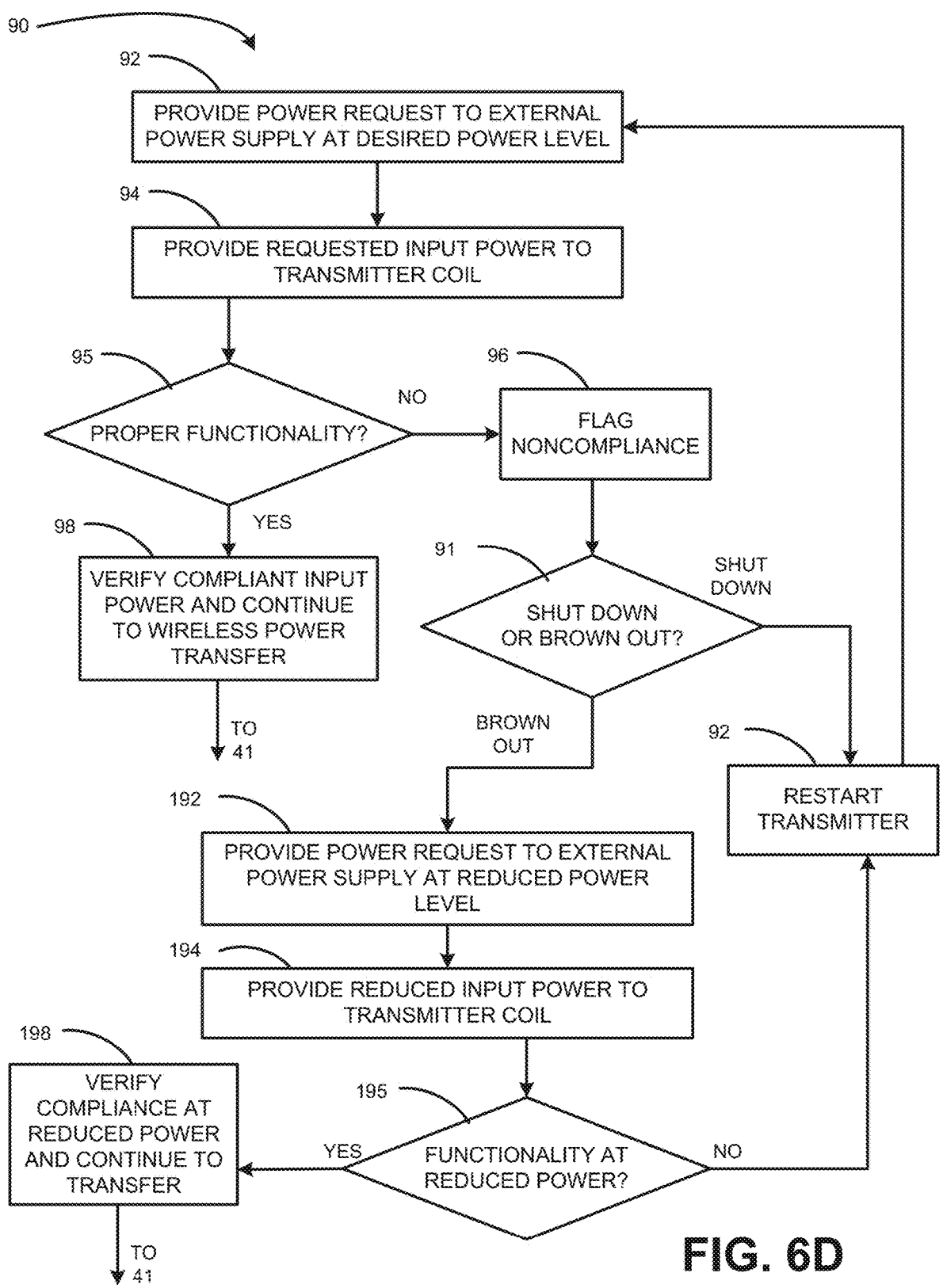
FIG. 6D is an exemplary block diagram illustrating functionality of a power verification system as executed by, for example, a transmitter controller and a transmission antenna, in accordance with FIGS. 1-6C and the present disclosure.

Turning to FIG. 6D, a flowchart for an exemplary system and/or method for performing the power verification 90 is illustrated. The flowchart begins at block 92, wherein a power request is provided from the power transmitter 20 to the external power supply 45, the power request made at a desired power level for proper operation of the power transmitter 20. In some examples, the power request for the proper power level may be based on a maximum power needed for the power transmitter 20 to function within parameters outlined by a certification and/or standards-based operation, such as operation in accordance with the WPC Qi Specification. Then, the input power supply 45 will supply power, based on its capabilities in response to the input power request, to the transmitter coil 21. Utilizing one or more sensors, functions, and/or capabilities (e.g., sensor(s) of the sensing system 50) of the power transmitter 20, the power verification 90 will determine if the transmitter coil 21 is receiving a power signal, based on the power input from the input power supply 45, that can result in proper power output to a power receiver 30, as illustrated in block 95. In other words, at block 95, the power verification 90 will sense if a power signal output by the transmitter coil 21 is strong enough to provide the proper maximum power output to a power receiver 30, if a power receiver 30 is in range to couple with the power transmitter 20.

At block 95, if the power verification 90 senses that an output signal of the transmitter coil 21 will provide compliant wireless power transmission signals to a power receiver 30, then the power verification 90 will continue to block 98, wherein compliance of the input power source is verified and the power transmitter 20 may proceed to wireless power transmission. In some examples, this results in the power transmitter 20 proceeding to perform the voltage control 41 operations, as discussed in more detail above. However, if, at block 95, it is determined that the signal output is not compliant for proper output to a power receiver 30, then the power verification may flag non-compliance (block 96) and, ultimately, restart or shut down the power transmitter 20 (block 92). In some examples, the flag of non-compliance may be set in a memory 27 of the transmitter controller 28, such that the power transmitter 20 need not continually run the power verification 90 when connected to a particular input power source 45.

In some examples wherein an initial power test results in a flag of non-compliance at block 96, the power verification 90 may further include a test to determine if the input power source 45 is capable of operations at a lower power level. In a non-limiting example, optimal operations of the power transmitter 20 may be at about 15 W of maximum output power, but the power transmitter 20 may also be capable of providing output power at a maximum output power of about 5 W, as an additional function. Thus, as illustrated at block 91, the power verification 90 may determine if the non-compliance of providing the output of the input power source 45, based on the power request, resulted in a shut down of the input power source 45, or if the output of the input power source 45, based on the power request, resulted in a reduced power level or "brown out" output from the input power source 45. If the result was a shut down, then the power verification proceeds to restart the power transmitter 20. Otherwise, in some examples, the power verification may continue to block 192, wherein the power verification 90 may determine if the power transmitter 20 can operate at a reduced power level.

As illustrated in block 192, the power verification 90 may provide another power request to the external power supply 45 at a reduced power level, reduced when compared to the initial desired power level requested at block 92. Then, the power verification 90 may provide the reduced input power to the transmitter coil 20. As illustrated at block 195, the power verification 90 may continue to determine if the power transmitter 20 has functionality at the reduced power level provided at block 192. If it is not functional, then the power verification 90 continues to block 92, wherein the transmitter is restarted. Otherwise, if functionality is detected at the reduced power level, then the power verification continues to block 198, wherein compliance at the reduced power level is verified and the power transmitter 20 proceeds to operate for wireless power transfer at the reduced power level. In some such examples, the input power source 45 may not be capable of providing the initial requested power, as it may have a current limit and if the requested power exceeds the current limit, then the voltage is reduced—causing the brown out. Thus, if the reduced voltage results in capabilities of power levels in line with the reduced power level, then the input power source 45 is capable of transmission at the reduced power level.

By including the power verification 90 as a function, component, and/or element of the transmission controller 28, the power transmitter 20 is capable of determining if an external power supply 45 is capable of providing the correct input power to the power transmitter 20, with the correct and/or necessary power, current, and/or voltage levels. This is particularly necessary in a growing market, wherein consumers own a plurality of different wall-plug charging devices that may output power via a standardized cable (e.g., a USB 2.0 cable, a USB-C cable, a Lightning cable, among other known power and/or data transfer medium). Thus, a user may plug the power transmitter 20 into a wall plug via such a cable; however, absent the power verification 90, the transmission controller 28 may not be capable of determining if the external power supply is compatible with the power transmitter 20. Therefore, absent the power verification 90, the power transmitter 20 may be limited to a singular or small number of compatible external power supplies 45; otherwise, by utilizing the power verification 90, the power transmitter 20 is capable of determining the capabilities of an external power supply 45 and then, itself, becomes capable of utilizing any external power supply that satisfies the power, current, and/or voltage requirements of the power transmitter 20.

Figure 7:
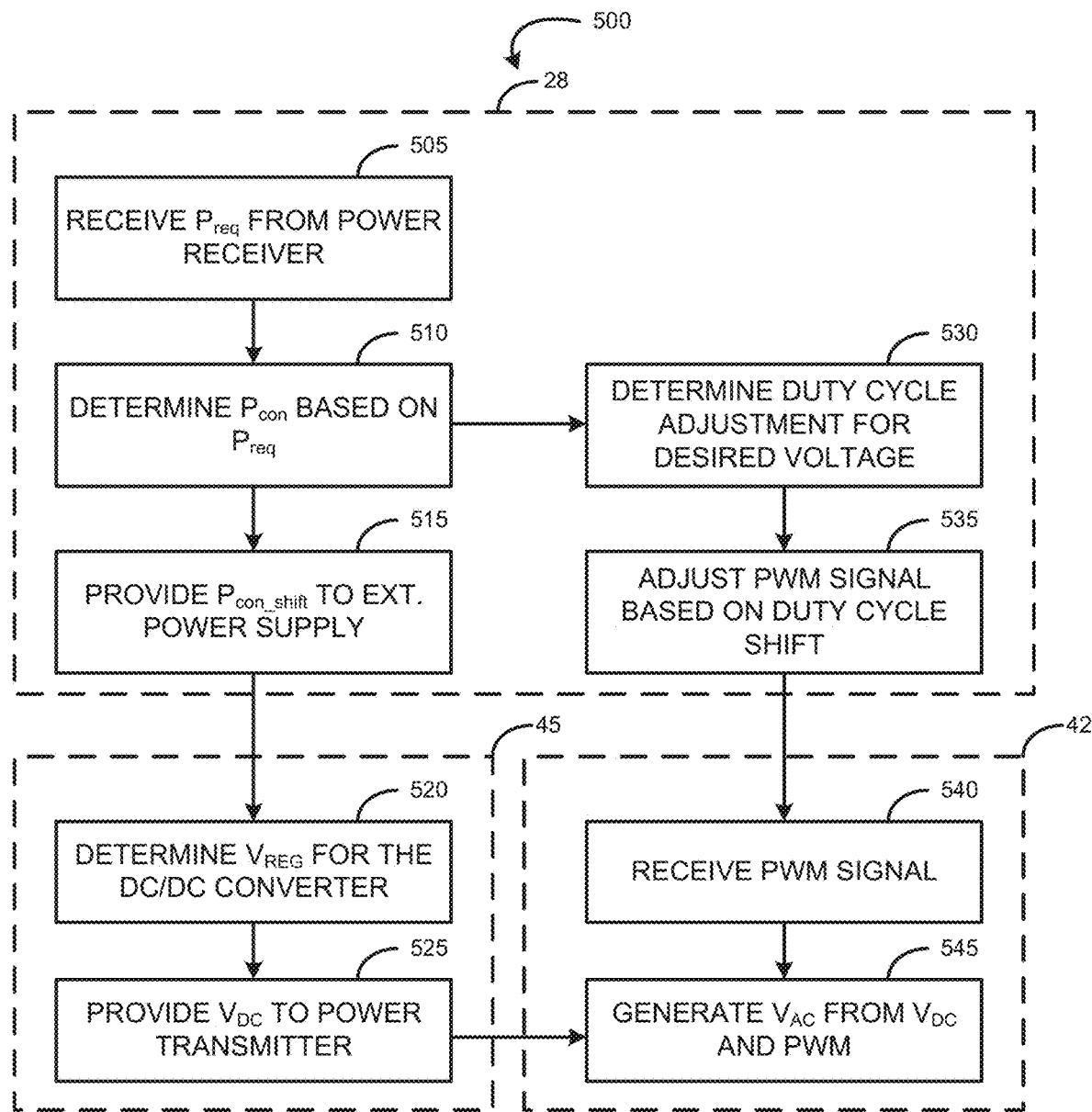
FIG. 7 is a block diagram for a method of controlling power output in the wireless power transmitter of FIGS. 1-6 and utilizing elements illustrated in FIGS. 6, in accordance with FIGS. 1-6 and the present disclosure.

Turning now to FIG. 7 and with continued reference to FIGS. 6A-C, a block diagram for an exemplary method 500 for controlling power input and/or output of the power transmitter 20 is illustrated. The method 500 may begin at block 505, wherein the transmitter controller 28 receives $P_{req}$ from the power receiver 30. As illustrated in block 510, the method 500 may include determining $P_{con}$ based on $P_{req}$.

Further, the method 500 includes providing $P_{con\_shift}$ of $P_{con}$ to the external power supply 45 and/or any components thereof. The external power transmitter 45 determines $V_{reg}$ based, at least, on $P_{con\_shift}$ (block 520) and determines and provides $V_{DC}$ to the power transmitter 20 (at the amplifier 42), based on $V_{reg}$ (block 525).

In some examples, such as those best described with reference to FIG. 6C, the method 500 may further include determining a duty cycle shift for $P_{con}$ ($P_{con\_shift}$) for further desired voltage configuration of $V_{AC}$, as illustrated in block 530. Further, PWM may then be altered and/or adjusted, based on $P_{con\_shift}$, as illustrated in block 535.

The amplifier 42 is configured to receive the PWM signal from the transmitter controller 28, as illustrated in block 540. Then, the amplifier 42 generates $V_{AC}$ based, at least in part, on $V_{DC}$ and PWM, as illustrated in block 545.

Figure 8:
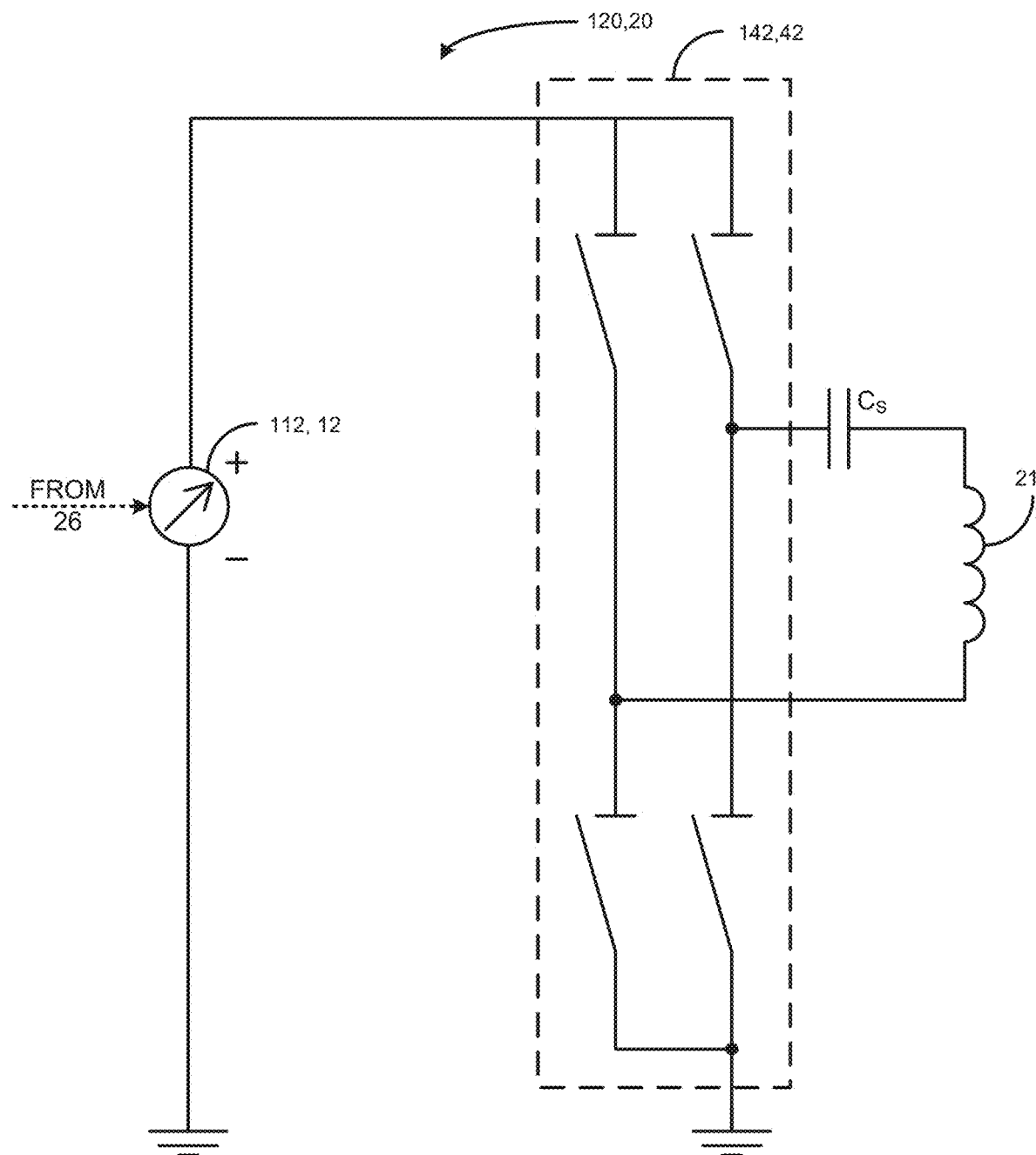
FIG. 8 is an exemplary electrical schematic diagram of components of the power transmitter of FIGS. 1-7, in accordance with FIGS. 1-7 and the present disclosure.

FIG. 8 is an exemplary schematic diagram 120 for an embodiment of the power transmitter 20. In the schematic, the amplifier 42 is a full-bridge inverter 142 which drives the transmitter coil 21 and a series capacitor $C_S$. In some examples, wherein the operating frequency of the power transmitter 20 is in the range of about 87 kHz and about 205 kHz, the transmitter coil 21 has a self-inductance in a range of about 5 µH to about 7 µH. In some such examples, $C_S$ has a capacitance in a range of about 400 nF to about 450 nF.

Based on controls configured by the control and communications system 26, an input power source 112, embodying the input power source 12, is altered to control the amount of power transferred to the power receiver 30. The input voltage of the input power source 112 to the full-bridge inverter 142 may be altered within a range of about 1 volt (V) to about 19 V, to control power output. In such examples, the resolution of the voltage of the input power source 112 may be 10 millivolts (mV) or less. In some examples, when the power transmitter 20, 120 first applies a power signal for transfer to the power receiver 30, the power signal of the input power source 112 has an initial input power voltage in a range of about 4.5 V to about 5.5 V.

The transmitter coil 21 may be of a wire-wound type, wound of, for example, Litz wire. As defined herein, Litz wire refers to a type of multistrand wire or cable utilized in electronics to carry an alternating current at a frequency. Litz wire is designed to reduce skin effect and proximity effect losses in conductors at frequencies up to about 1 MHz and consists of many thin wire strands, individually insulated and twisted or woven together, following a pattern. In some examples, the Litz wire may be no. 17 American Wire Gauge (AWG) (1.15 mm) type 2 Litz wire, having 105 strands of no. 40 AWG (0.08 mm diameter), or equivalent wire. In some examples, the Litz wire used for the transmitter coil 21 may be a bifilar Litz wire. To that end, utilizing thicker Litz wire, such as the no. 17 AWG type 2 Litz wire, utilizing bifilar Litz wire, and combinations thereof, may result in an increased Quality Factor (Q) for the transmitter coil 21 and higher Q may be directly related to increases in gap 17 height and/or Z-Distance. As Q is directly related to the magnitude of the magnetic field produced by the transmitter antenna 21 and, thus, with a greater magnitude magnetic field produced, the field emanating from the transmission antenna 21 can reach greater Z-distances and/or charge volumes, in comparison to legacy transmission coils, having lower Q designs. While Litz wire is described and illustrated, other equivalents and/or functionally similar wires may be used. Furthermore, other sizes and thicknesses of Litz wire may be used.

Figure 9:
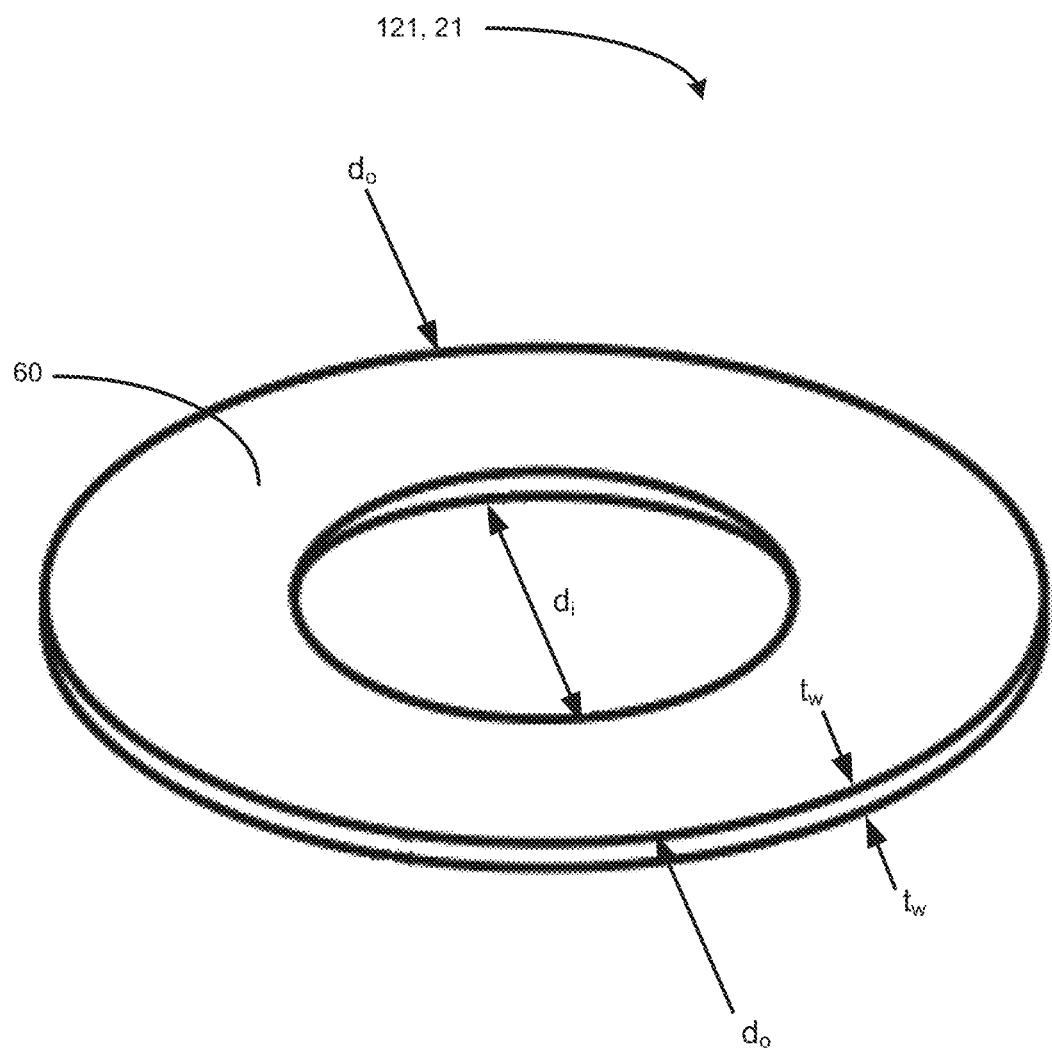
FIG. 9 is a perspective view of a shape of a transmitter coil of the power transmitter of FIGS. 1-8, in accordance with FIGS. 1-8 and an embodiment of the present disclosure.

Turning to FIG. 9, an exemplary diagram 121, for portraying dimensions of the transmitter antenna 21, is illustrated. The diagram 121 is a top perspective view of the transmitter antenna 21 and shows a top face 60 of the transmitter antenna 21. Note that the diagram 121 is not necessarily to scale and is for illustrative purposes. The top face 60 and the transmitter antenna 21, generally, are relatively circular in shape. As illustrated, an outer diameter $d_o$ is defined as an exterior diameter of the transmitter antenna 21. In some examples, the outer diameter $d_o$ has an outer diameter length in a range of about 40 mm to about 50 mm. An inner diameter $d_i$ is defined as the diameter of the void space in the interior of the transmitter antenna 21. The inner diameter $d_i$ may have an inner diameter length in a range of about 15 mm to about 25 mm. The outer diameter $d_o$ and the inner diameter $d_i$ may be relatively concentric, with respect to one another. The transmitter coil 21 has a thickness $t_w$, which is defined as the thickness of the wire of the coil. The thickness $t_w$ may be in a range of about 2 mm to about 3 mm. In such examples, the transmitter coil 21 may be made of Litz wire and include at least two layers, the at least two layers stacked upon each other. Utilization of one or more of an increased inner diameter $d_i$, an increased outer diameter $d_o$, multiple Litz wire layers for the antenna 21, specific dimensions disclosed herein, and/or combinations thereof, may be beneficial in achieving greater gap 17 heights and/or Z-distances. Other shapes and sizes of the transmitter antenna 21 may be selected based on the configuration with the selection of the shape and size of the shielding of the transmitter coil. In the event that a desired shielding in required, the transmitter antenna 21 may be shaped and sized such that the shielding surrounds the transmitter antenna 21 in accordance with an embodiment.

Figure 10:
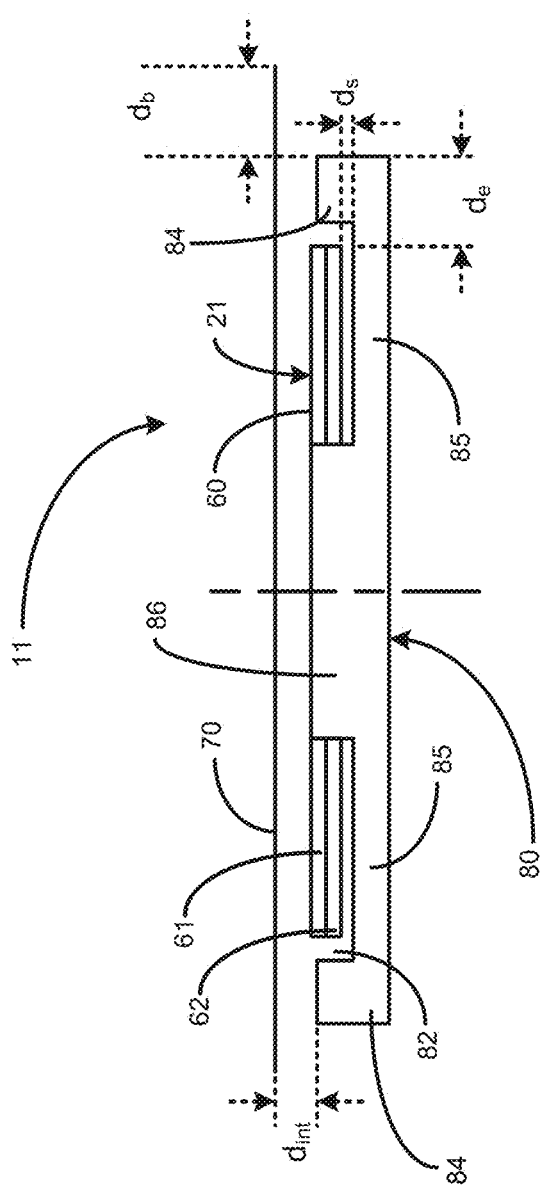
FIG. 10 is a cross-section of components of a base station, with which the power transmitter 20 is associated, in accordance with FIGS. 1-9 and the present disclosure.

Turning now to FIG. 10, a cross-sectional view of the transmitter coil 21, within the base station 11 and partially surrounded by a shielding 80 of the transmitter coil 21, is illustrated. The shielding 80 comprises a ferrite core and defines a cavity 82, the cavity configured such that the ferrite core substantially surrounds all but the top face 60 of the transmitter antenna 21 when the transmitter antenna 21 is placed in the cavity. As used herein, "surrounds" is intended to include covers, encircles, enclose, extend around, or otherwise provide a shielding for. "Substantially surrounds," in this context, may take into account small sections of the coil that are not covered. For example, power lines may connect the transmitter coil 21 to a power source. The power lines may come in via an opening in the side wall of the shielding 80. The transmitter coil 21 at or near this connection may not be covered. In another example, the transmitter coil 21 may rise slightly out of the cavity and thus the top section of the side walls may not be covered. By way of example, substantially surrounds would include coverage of at least 50+% of that section of the transmitter antenna. However, in other examples, the shielding may provide a greater or lesser extend of coverate for one or more sides of the transmitter antenna 21.

In an embodiment, as shown in FIG. 10, the shielding 80 surrounds at least the entire bottom section of the transmitter antenna 21 and almost all of the side sections of the transmitter antenna 21. As used herein, the entire bottom section of the transmitter antenna 21 may include, for example, the entire surface area of the transmitter antenna 21 or all of the turns of the Litz wire of the transmitter antenna 21. With respect to the side walls, as shown in FIG. 8, the magnetic ring 84 does not extend all the way up the side wall of the transmitter antenna 21. However, as shown in other illustrations, the side wall may extend all the way up the side wall.

Figure 12A:
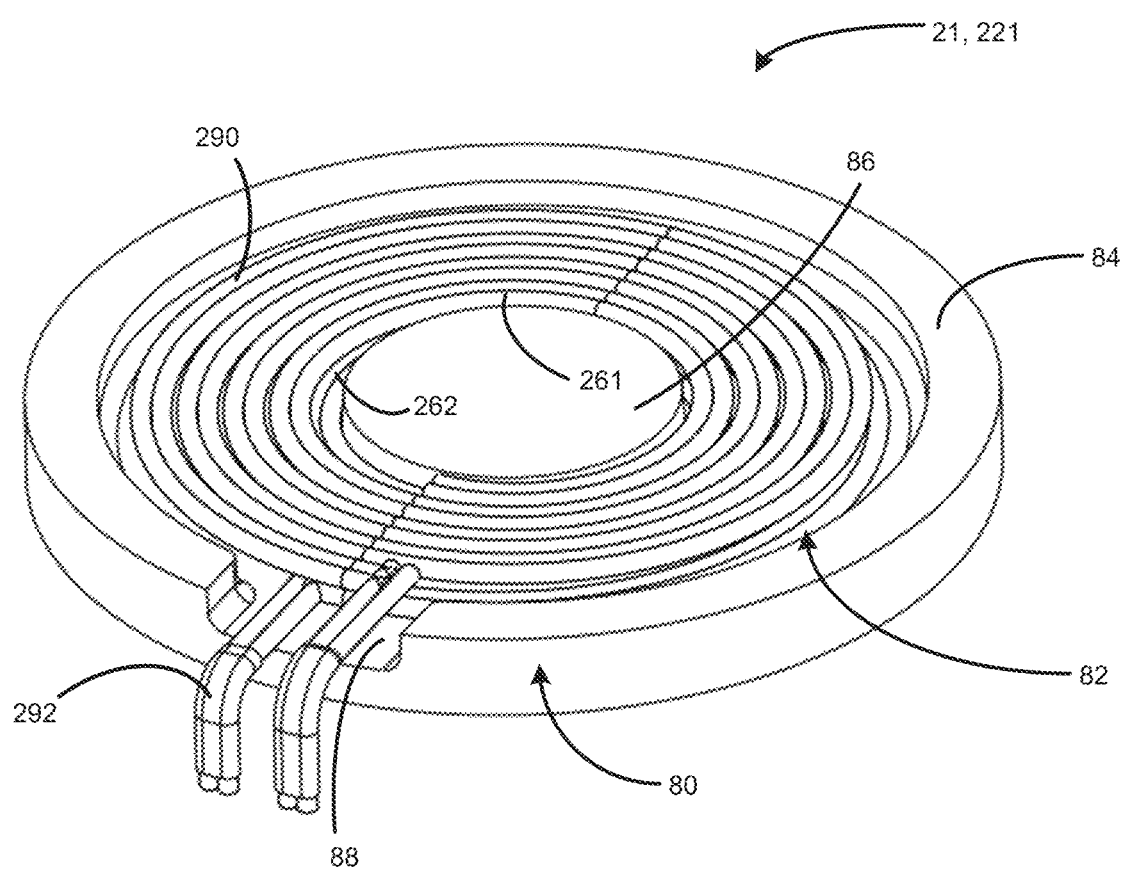
FIG. 12A is a perspective view of the transmitter coil of FIGS. 1-11 and the shielding of FIGS. 10 and 11, in accordance with FIGS. 1-11 and the present disclosure.
Figure 12B:
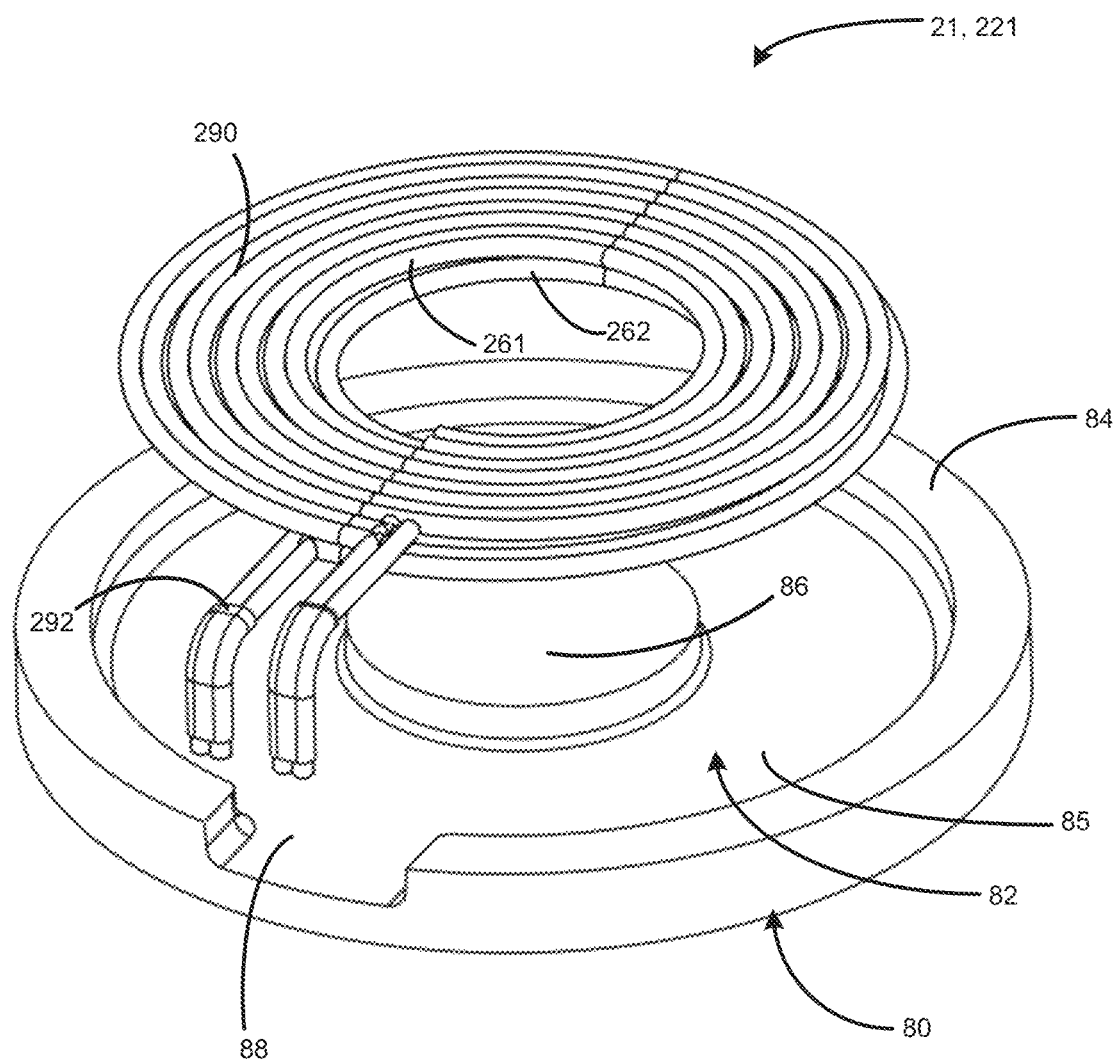
FIG. 12B is an exploded perspective view of the transmitter coil of FIGS. 1-10 and the shielding of FIGS. 10 and 11, in accordance with FIGS. 1-12A and the present disclosure.

In another embodiment, the shielding 80 may surround less than the entire bottom section of the transmitter antenna 21. For example, connecting wires (e.g., connecting wires 292, as best illustrated in FIGS. 12A, 12B and discussed below) may be run through an opening in the bottom of the shielding 80.

In an embodiment, as shown in FIG. 10, the shielding 80 is an "E-Core" type shielding, wherein the cavity 82 and structural elements of the shielding 80 are configured in an E-shape configuration, when the shielding is viewed, cross-sectionally, in a side view. The E-Core configuration is further illustrated in FIG. 11, which is a perspective view of the shielding 80. The shielding 80 may include a magnetic core 86, a magnetic backing 85, and a magnetic ring 84. The magnetic core 86 is spaced inwardly from the outer edge of the magnetic backing 85 and projects in an upward direction from the top surface of the magnetic backing 85. The magnetic core 86 and the magnetic ring 84 function to surround the transmitter coil 21 and to direct and focus magnetic fields, hence improving coupling with the receiver coil 31 of the power receiver 30.

In addition to covering the entire outer diameter of the transmitter coil 21, the shielding 80 may also cover the inner diameter $d_i$ of the transmitter coil 21. That is, as shown, the inner section of the E-Core configuration may protrude upward through the middle of the transmitter coil 21.

In an embodiment, the cavity 82 is configured such that the shielding 80 covers the entire bottom section of the transmitter coil 21 and the entire side sections of the transmitter coil 21. The top section of the transmitter coil 21 is not covered. The bottom section of the transmitter coil 21 is the side of the transmitter coil 21 that is opposite of the direction of the primary power transfer to the receiver coil. With a wire wound transmitter coil 21, the side section of the transmitter coil 21 includes the side section of the outer most winding of the coil 21.

Figure 11:
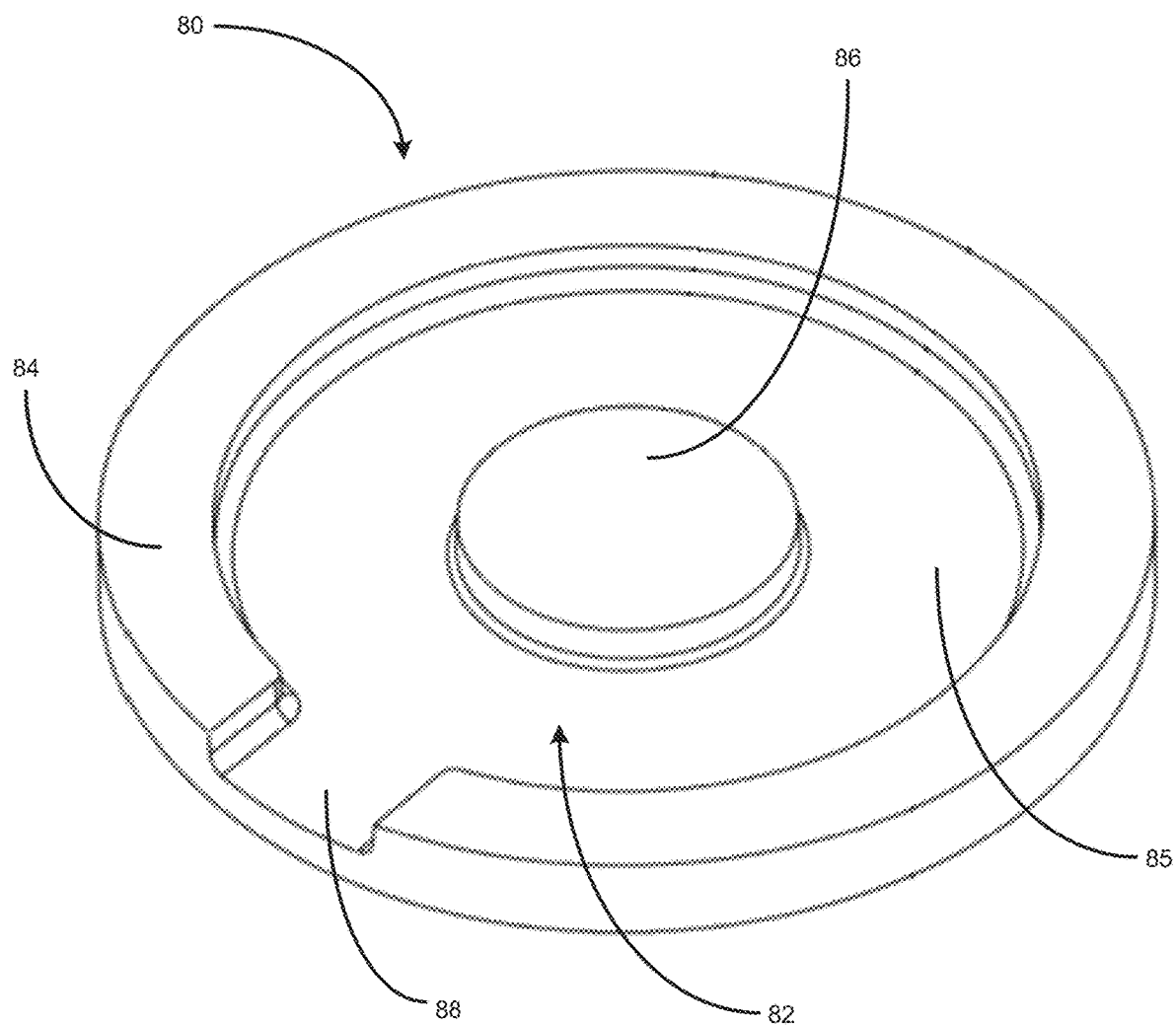
FIG. 11 is a perspective view of a shielding associated with the transmitter coil of FIGS. 1-10, in accordance with FIGS. 1-10 and an embodiment of the present disclosure.

FIG. 12A is a perspective view of the transmitter coil 21 and the embodiment of the E-core shielding of FIG. 11 and FIG. 12B is an exploded perspective view of the transmitter coil 21 and the embodiment of the E-core shielding of FIG. 11. The transmitter coil 21 is positioned above the shielding 80, whose combination of structural bodies, as discussed above, may include the combination of the magnetic core 86, the magnetic backing 85, and magnetic ring 84. This magnetic shielding combination functions to help direct and concentrate magnetic fields created by transmitter coil 21 and can also limit side effects that would otherwise be caused by magnetic flux passing through nearby metal objects. In some examples, the magnetic ring defines an opening 88, in which a connecting wire 292 of the transmitter coil 21 can exit the shielding 80.

As defined herein, a "shielding material," from which the shielding 80 is formed, is a material that captures a magnetic field. An example of which is a ferrite material. The ferrite shield material selected for the shielding 80 also depends on the operating frequency, as the complex magnetic permeability ($\mu=\mu'-j*\mu''$) is frequency dependent. The material may be a sintered flexible ferrite sheet or a rigid shield and be composed of varying material compositions. In some examples, the ferrite material for the shielding 80 may include a Ni—Zn ferrite, a Mn—Zn ferrite, and any combinations thereof.

Returning now to FIG. 10 and with continued reference to FIGS. 11 and 12A-B, the shielding 80 is aligned with the transmitter antenna 21 such that the shielding 80 substantially surrounds the transmitter antenna 21 on all sides, aside from the top face 60. In other words, the transmitter antenna 21 may be wound around the magnetic core 86 and be surrounded, on the bottom and sides, respectively, by the magnetic backing 85 and the magnetic ring 84. As illustrated, the shielding 80, in the form of one or both of the magnetic backing and the magnetic core, may extend beyond the outer diameter $d_o$ of the transmitter antenna 21 by a shielding extending distance $d_e$. In some examples, the shielding extending distance $d_e$ may be in a range of about 5 mm to about 6 mm. The shielding 80, at the magnetic backing 85, and the transmitter coil 21 are separated from one another by a separation distance $d_s$, as illustrated. In some examples, the separation distance $d_s$ may be in a range of about 0.1 mm and 0.5 mm.

An interface surface 70 of the base station 11 is located at a interface gap distance $d_{int}$ from the transmitter coil 21 and the shielding 80. The interface surface 70 is a surface on the base station 11 that is configured such that when a power receiver 30 is proximate to the interface surface 70, the power receiver 30 is capable of coupling with the power transmitter 20, via near-field magnetic induction between the transmitter antenna 21 and the receiver antenna 31, for the purposes of wireless power transfer. In some examples, the interface gap distance $d_{int}$ maybe in a range of about 8 mm to about 10 mm. In such examples, the $d_{int}$ is greater than the standard required Z-distance for Qi™ certified wireless power transmission (3-5 mm). Accordingly, by having a greater $d_{int}$, empty space and/or an insulator can be positioned between the transmission coil 21 and the interface surface 70 to mitigate heat transfer to the interface surface 70, the power receiver 30, and/or the electronic device 14 during operation. Further, such a greater $d_{int}$ allows for interface design structures in which objects on or attached to the electronic device 14 may remain attached to the electronic device during operation. As described in greater detail below, design features of the interface surface 70 may be included for interaction with such objects for aligning the power transmitter 20 and the power receiver 30 for operation.

Returning now to FIG. 12B, an exemplary coil 221 for use as the transmitter antenna 21 is illustrated in the exploded view of the transmitter antenna 21 and shielding 80. The coil 221 includes one or more bifilar Litz wires 290 for the first bifilar coil layer 261 and the second bifilar coil layer 262. "Bifilar," as defined herein, refers to a wire having two closely spaced, parallel threads and/or wires. Each of the first and second bifilar coil layers 261, 262 include N number of turns. In some examples, each of the first and second bifilar coil layers 261, 262 include about 4.5 turns and/or the bifilar coil layers 261, 262 may include a number of turns in a range of about 4 to about 5. In some examples, the one or more bifilar Litz wire 290 may be no. 17 AWG (1.15 mm) type 2 Litz wire, having 105 strands of no. 40 AWG (0.08 mm diameter), or equivalent wire. Utilization of multiple layers, thick Litz wire, bifilar Litz wire, and any combinations thereof, may result in the coil 21 achieving greater Q and/or may result in increases in gap 17 height and/or Z-distance between the coil 21 and a receiver coil.

Figure 13A:
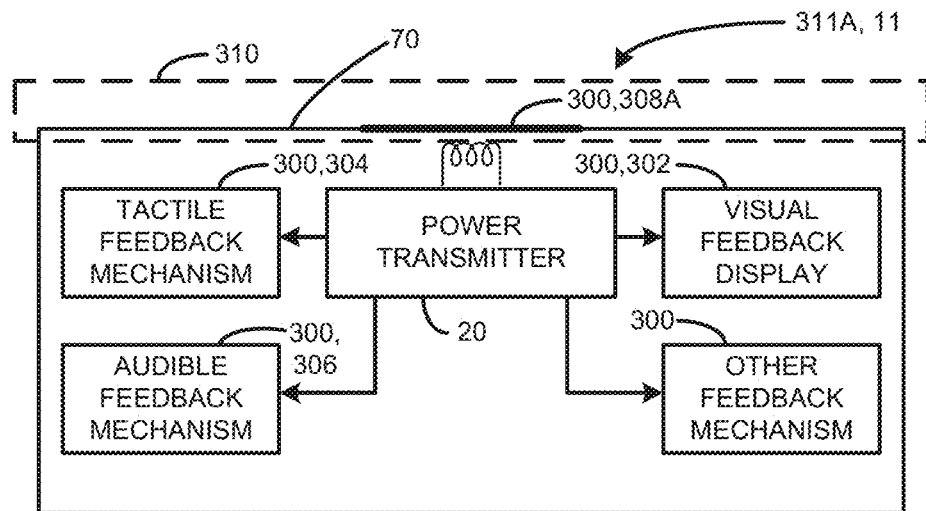
FIG. 13A is an exemplary block diagram for an embodiment of the base station of FIGS. 1-10 in accordance with FIGS. 1-12 and the present disclosure.

FIG. 13A is a first block diagram 311A for an implementation of the base station 11. As illustrated, the power transmitter 20 is contained within the base station 11. In some examples, the base station 11 includes one or more user feedback mechanisms 300, wherein each of the one or more user feedback mechanisms 300 are configured for aiding a user in aligning a power receiver 30 and/or its associated electronic device 14 with an active area 310 for wireless power transmission via the transmitter coil 21, wherein the power receiver 30 is configured to acquire near field inductive power from the transmitter coil 21. The "active area" 310, as defined herein, refers to any area, volume, and/or space proximate to the interface surface 70 wherein the power transmitter 20 is capable of transmitting near field inductive power to a power receiver 30.

The one or more user feedback mechanisms 300 may include one or more of a visual feedback display 302, a tactile feedback mechanism 304, an audible feedback mechanism 306, a marking 308 on the interface surface 70, any other feedback mechanisms 300, and any combinations thereof. The visual feedback display 302 is configured for visually indicating proper alignment of the power receiver 30 with the active area 310. The visual feedback display 302 may include, but is not limited to including, a visual screen, a light, a light emitting diode (LED), a liquid crystal display (LCD) display, other visual displays, and/or any combinations thereof. The tactile feedback mechanism 304 is configured for tactilely indicating if the power receiver 30 is in proper alignment with the active area 310. The tactile feedback mechanism 304 may include, but is not limited to including, a haptic feedback device, a vibrating device, other tactile feedback mechanisms, and any combinations thereof. The audible feedback device 306 is configured for audibly indicating if the power receiver 30 is in proper alignment with the active area 310. The audio feedback mechanism 306 may include, but is not limited to including, a speaker, a sound generator, a voice generator, an audio circuit, an amplifier, other audible feedback devices, and any combinations thereof.

The marking 308 may be any visual and/or mechanical signifier, indicating where a user of the electronic device 14 should place his/her/their electronic device 14 on the interface surface 70, such that the power transmitter 20 will be in proper alignment with the power receiver 30 of the electronic device 14. Additionally or alternatively, the marking 308 may indicate a location of the active area 310 and/or a proper location within the active area 70. In the exemplary embodiment of the diagram 311A, the marking 308A may be a substantially two-dimensional visual indicator marked on the interface surface 70. The substantially two-dimensional marking 308A may include, but is not limited to including, a printed indicator, a logo, a message indicating a user should place the electronic device 14 upon the marking 308A, any other substantially two-dimensional markings, and any combinations thereof.

Figure 13B:
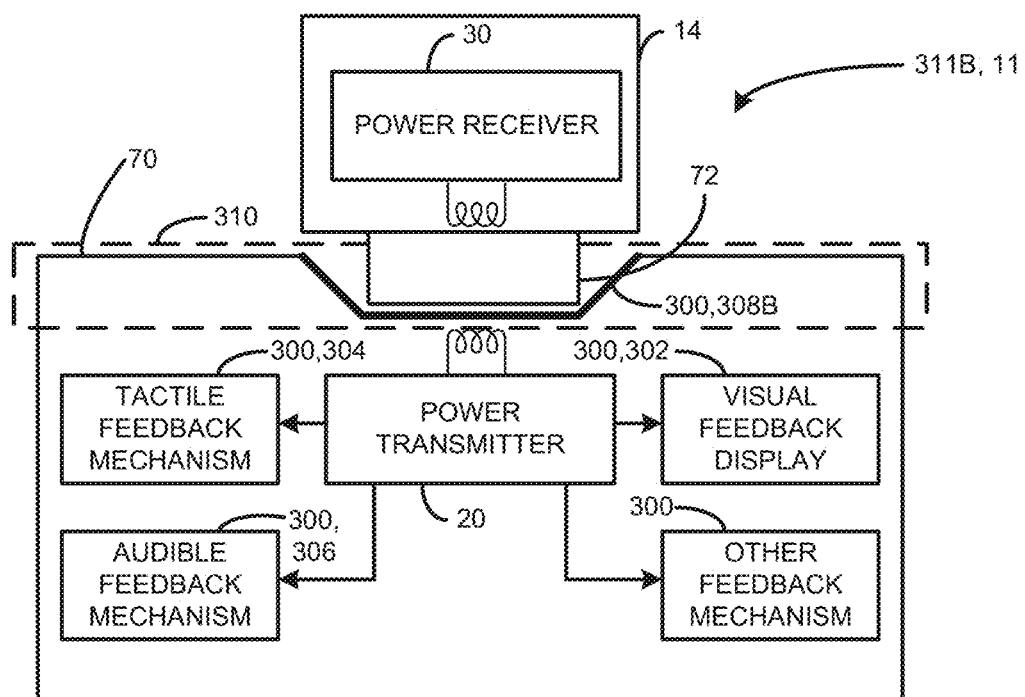
FIG. 13B is an exemplary block diagram for another embodiment of the base station of FIGS. 1-10 in accordance with FIGS. 1-12 and the present disclosure.

In an alternative embodiment in a second schematic block diagram 311B illustrated in FIG. 13B, the marking 308B is a substantially three-dimensional and/or mechanical marking 308B, such as, but not limited to, an indentation and/or notch in the interface surface 70. The three-dimensional marking 308B may be configured to interact with mechanical feature 72 of the electronic device 14. The mechanical feature 72 may be any mechanical feature of the electronic device 14 and/or another connected mechanical feature and/or device associated with the electronic device 14. Accordingly, interaction between the mechanical feature 72 and the three-dimensional marking 308B may be configured to align the power transmitter 20 with the power receiver 30 of the electronic device 14. For example, the mechanical feature 72 may be an external protrusion located relatively proximate to the power receiver 30 of electronic device 14 and the marking 308B is configured to receive the mechanical feature and, by the nature of such receipt, the power transmitter 20 and the power receiver 30 are properly aligned for near-field inductive wireless power transfer. In some such examples, the electronic device 14 is a mobile device, such as a smart phone and/or tablet computing device, and the mechanical feature 72 may be an externally attached grip device configured for gripping the electronic device 14 when in use. In such examples, the marking 308B is configured to receive the grip device mechanical feature 72 and enable proper alignment of the power transmitter 20 and the power receiver 30 for near-field inductive wireless power transfer while the removable mechanical feature 72 remains attached to the electronic device 14.

Figure 14:
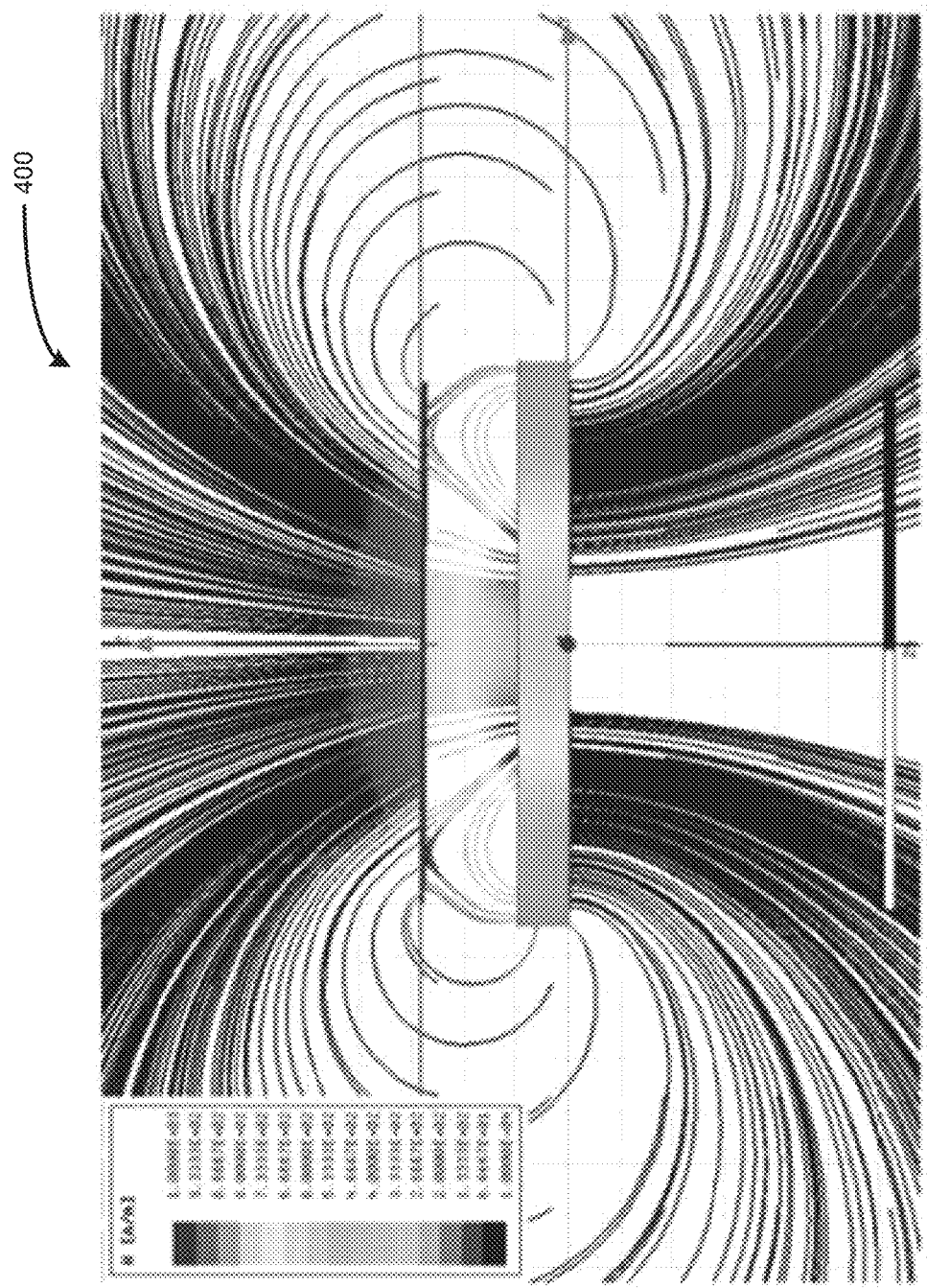
FIG. 14 is a readout of an actual simulation of magnetic fields generated by the coils and/or transmitters illustrated in FIGS. 1-13 and disclosed herein.

FIG. 14 is an exemplary, actual, simulation 400 of a magnetic field generated by a transmitter coil 21 and/or its associated power transmitter 20 and captured by an exemplary receiver coil 31 and/or its associated power receiver 30, when the transmitter coil 21 and/or power transmitter 20 are designed, manufactured, and/or implemented according to the teachings of this disclosure. The receiver coil 30 was as a standard Qi™ receiver coil utilized by commercial electronic devices, such as mobile phones, and the receiver coil 30 was modelled with a metal piece behind the coil, wherein the metal piece was used to simulate a battery. The simulation shows that the magnetic field generated by the transmitter coil 20 was captured by the receiver coil 30 at an extended Z-distance of 9 mm. As discussed previously, Qi™ wireless transmitter coils typically operate between coil-to-coil distances of about 3 mm to about 5 mm. The shaped-magnetics of the transmitter coil 21 have shown to favorably reshape a magnetic field so that coil-to-coil coupling can occur at extended Z-distances, wherein the Z-distances are extended about 2 times to about 5 times the distance of standard Qi™ wireless power transmitters. Furthermore, the shaped-magnetics of the present application can extend coupling of present day a Qi™ wireless power transmitter at a Z-distance ranging about 5 mm to about 25 mm. Any of the E-core and/or additional or alternative custom shapes for the shielding 80, may successfully be used to reshape the magnetic field for extended Z-distance coupling by a minimum of a 5% compared to standard present-day power transmitters. In addition, any of the E-core and custom shapes previously discussed, each in conjunction with its relation to a coil to the magnetic has also may further increase z-direction coupling by at least another 5%. An embodiment comprising a structure, the structure comprising a coil and a magnetic material, wherein a gap between the coil and the magnetic material residing at the inner diameter of the coil comprises 2 mm, reshapes the magnetic field so that coupling increases by 5%.

As is discussed above, the transmitter coils 21, power transmitters 20, and/or base stations 11, disclosed herein, may achieve great advancements in Z-distance and/or gap 17 height, when compared to legacy, low-frequency (e.g., in a range of about 87 kHz to about 205 kHz) transmission coils, power transmitters, and/or base stations. To that end, an extended Z-distance not only expands a linear distance, within which a receiver may be placed and properly coupled with a transmitter, but an extended Z-distance expands a three-dimensional charging and/or operational volume ("charge volume"), within which a receiver may receive wireless power signals from a transmitter. For the following example, the discussion fixes lateral spatial freedom (X and Y distances) for the receiver coil, positioned relative to the transmitter coil, as a control variable. Accordingly, for discussion purposes only, one assumes that the X and Y distances for the base stations 11, power transmitters 20, and/or transmitter coils 21 are substantially similar to the X and Y distances for the legacy system(s). However, it is certainly contemplated that the inventions disclosed herein may increase one or both of the X-distance and Y-distance. Furthermore, while the instant example uses the exemplary range of 8-10 mm for the Z-distance of the base stations 11, power transmitters 20, and/or transmitter coils 21, it is certainly contemplated and experimental results have shown that the base stations 11, power transmitters 20, and/or transmitter coils 21 are certainly capable of achieving Z-distances having a greater length than about 10 mm, such as, but not limited to, up to 15 mm and/or up to 30 mm. Accordingly, the following table is merely exemplary and for illustration that the expanded Z-distances, achieved by the base stations 11, power transmitters 20, and/or transmitter coils 21, have noticeable, useful, and beneficial impact on a charge volume associated with one or more of the base stations 11, power transmitters 20, and/or transmitter coils 21.

| Spatial Freedom Comparison | | | | | | |
|---|---|---|---|---|---|---|
| | X-dist | Y-dist | Z-dist (min) | Z-dist (max) | Charge Vol. (min) | Charge Vol. (max) |
| Legacy | 5 mm | 5 mm | 3 mm | 5 mm | 75 mm$^3$ | 125 mm$^3$ |
| 11, 20, 21 (8-10 mm. ver.) | 5 mm | 5 mm | 8 mm | 10 mm | 200 mm$^3$ | 250 mm$^3$ |
| 11, 20, 21 (15 mm. ver.) | 5 mm | 5 mm | 10 mm | 15 mm | 250 mm$^3$ | 375 mm$^3$ |
| 11, 20, 21 (30 mm. ver.) | 5 mm | 5 mm | 15 mm | 30 mm | 375 mm$^3$ | 750 mm$^3$ |

Thus, by utilizing the base stations 11, power transmitters 20, and/or transmitter coils 21, the effective charge volume may increase by more than 100 percent, when compared to legacy, low-frequency wireless power transmitters. Accordingly, the base stations 11, power transmitters 20, and/or transmitter coils 21 may achieve large Z-distances, gap heights, and/or charge volumes that were not possible with legacy low frequency, but thought only possible in lower power, high frequency (e.g., above about 2 Mhz) wireless power transfer systems.

Figures 15, 16:
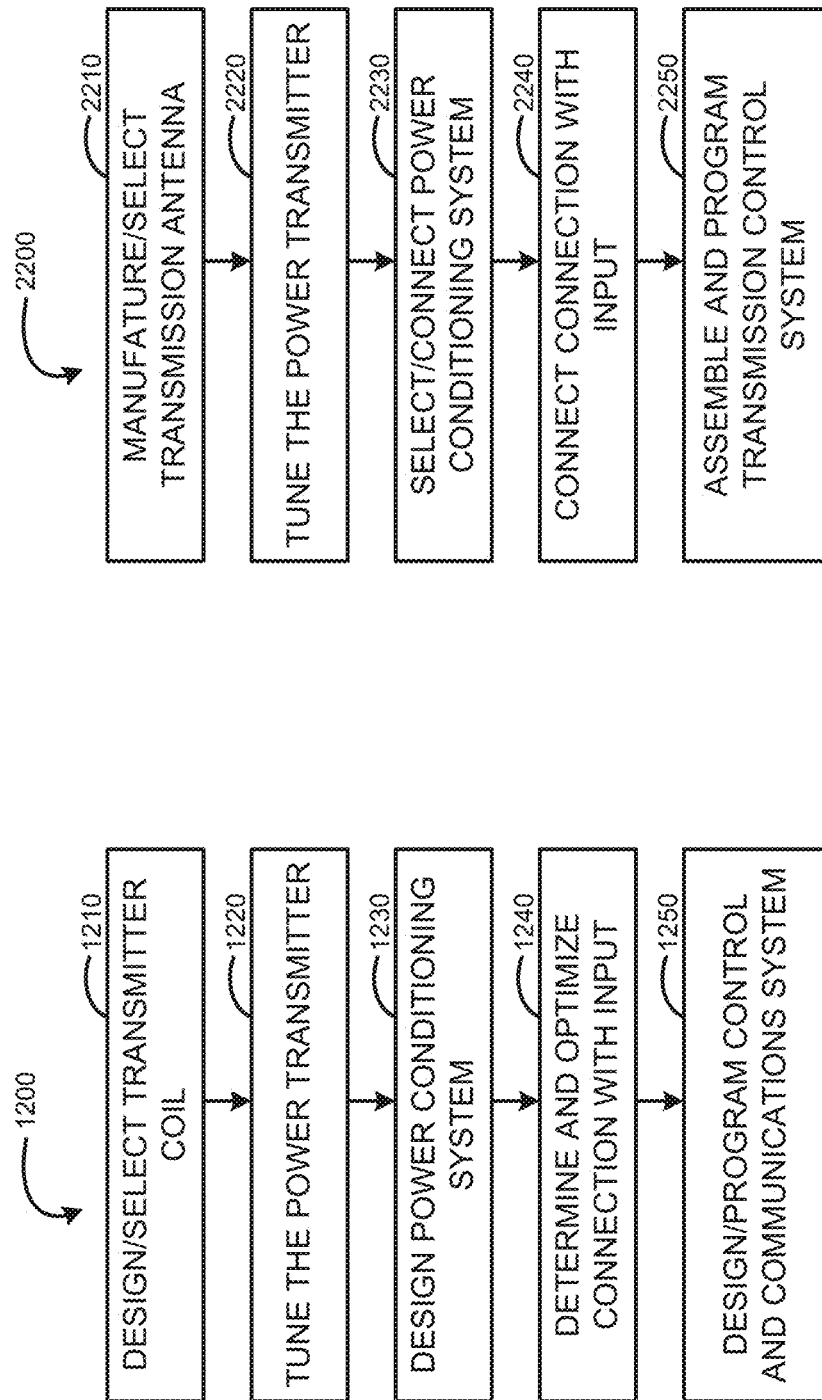
FIG. 15 is a flow chart for an exemplary method for designing a power transmitter, in accordance with FIGS. 1-14 and the present disclosure.
FIG. 16 is a flow chart for an exemplary method for manufacturing a power transmitter, in accordance with FIGS. 1-14 and the present disclosure.

FIG. 15 is an example block diagram for a method 1200 for designing the power transmitter 20. The method 1200 includes designing and/or selecting the transmitter coil 21 for the power transmitter 20, as illustrated in block 1210. The method 1200 includes tuning the power transmitter 20, as illustrated in block 1220. Such tuning may be utilized for, but not limited to being utilized for, impedance matching.

The method 1200 further includes designing the power conditioning system 40 for the power transmitter 20, as illustrated in block 1230. The power conditioning system 40 may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. Further, at block 1240, the method 1200 may determine and optimize a connection, and any associated connection components, to configure and/or optimize a connection between the input power source 12 and the power conditioning system 40 of block 1230. Such determining, configuring, and/or optimizing may include selecting and implementing protection mechanisms and/or apparatus, selecting and/or implementing voltage protection mechanisms, among other things.

The method 1200 further includes designing and/or programing the control and communications system 26 of the power transmitter 20, as illustrated in block 1250. Components of such designs include, but are not limited to including, the sensing system 50, the driver 41, the transmission controller 28, the memory 27, the communications system 29, the thermal sensing system 52, the object sensing system 54, the receiver sensing system 56, the electrical sensor(s) 57, the other sensor(s) 58, in whole or in part and, optionally, including any components thereof.

FIG. 16 is an example block diagram for a method 2200 for manufacturing the power transmitter 20. The method 2200 includes manufacturing and/or selecting the transmitter coil 21 for the power transmitter 20, as illustrated in block 2210. The method 2200 includes tuning the power transmitter 20, as illustrated in block 2220. Such tuning may be utilized for, but not limited to being utilized for, impedance matching.

The method 2200 further includes manufacturing the power conditioning system 40 for the power transmitter 20, as illustrated in block 2230. The power conditioning system 40 may be designed and/or manufactured with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. Further, at block 2240, the method 2200 may include connecting and/or optimizing a connection, and any associated connection components, to configure and/or optimize a connection between the input power source 12 and the power conditioning system 40 of block 2230. Such determining, manufacturing, configuring, and/or optimizing may include selecting and implementing protection mechanisms and/or apparatus, selecting and/or implementing voltage protection mechanisms, among other things.

The method 2200 further includes designing and/or programing the control and communications system 26 of the power transmitter 20, as illustrated in block 2250. Components of such designs include, but are not limited to including, the sensing system 50, the driver 41, the transmission controller 28, the memory 27, the communications system 29, the thermal sensing system 52, the object sensing system 54, the receiver sensing system 56, the electrical sensor(s) 57, the other sensor(s) 58, in whole or in part and, optionally, including any components thereof.

While illustrated as individual blocks and/or components of the wireless power transmitter 20, one or more of the components of the wireless power transmitter 20 may combined and/or integrated with one another as an integrated circuit (IC), a system-on-a-chip (SoC), among other contemplated integrated components. Further, any operations, components, and/or functions discussed with respect to the power transmitter 20 and/or components thereof may be functionally embodied by hardware, software, and/or firmware of the power transmitter 20.

Similarly, while illustrated as individual blocks and/or components of the power receiver 30, one or more of the components of the power receiver 30 may combined and/or integrated with one another as an IC, a SoC, among other contemplated integrated components. Further, any operations, components, and/or functions discussed with respect to the power receiver 30 and/or components thereof may be functionally embodied by hardware, software, and/or firmware of the power receiver 30

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "mean for" or, in the case of a method claim, the element is recited using the phrase "step for."

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub combination.

The invention claimed is:

1. A power transmitter for wireless power transfer, the power transmitter comprising:
    a controller comprising:
        at least one processor;
        at least one machine-readable medium; and
        program instructions stored on the at least one machine-readable medium which, when executed by the at least one processor, cause the controller to:
            provide a power request to an external power supply for direct current (DC) input power at or above a power level for the power transmitter to provide an alternating current (AC) wireless power signal to a power receiver;
            provide a driving signal to an inverter circuit for generating the AC wireless power signal;
            monitor the AC wireless power signal at a coil, the AC wireless power signal based on the driving signal;
            determine that the monitored AC wireless power signal at the coil is compliant with the power request; and
            based on determining that the AC wireless power signal at the coil is compliant with the power request, verify power compliance for the external power supply and continue to operate for wireless power transmission;
    the inverter circuit configured to receive the DC input power from the external power supply and convert the DC input power to the AC wireless power signal; and
    the coil configured to transmit the AC wireless power signal to the power receiver.

2. The power transmitter of claim 1, wherein the controller further comprises program instructions stored on the at least one machine-readable medium which, when executed by the at least one processor cause the controller to:
    determine that the AC wireless power signal is non-compliant with the power request; and
    based on determining that the AC wireless power signal is non-compliant with the power request, store a flag of non-compliance for the external power supply.

3. The power transmitter of claim 2, wherein the controller further comprises program instructions stored on the at least one machine-readable medium which, when executed by the at least one processor cause the controller to:
    determine if the flag of non-compliance was caused by a shutdown of the power transmitter or a brownout of the power transmitter.

4. The power transmitter of claim 3, wherein the controller further comprises program instructions stored on the at least one machine-readable medium which, when executed by the at least one processor cause the controller to:
    based on determining that the flag of non-compliance was caused by the shutdown of the power transmitter, restart the power transmitter.

5. The power transmitter of claim 3, wherein the controller further comprises program instructions stored on the at least one machine-readable medium which, when executed by the at least one processor cause the controller to:
    based on determining that the flag of non-compliance was caused by the brownout of the power transmitter:
        provide a reduced power request to the external power supply;
        determine if a reduced AC wireless power signal at the coil is compliant with the reduced power request; and
        based on determining that the reduced AC wireless power signal at the coil is compliant with the reduced power request, provide an updated driving signal to the inverter circuit for generating an updated AC wireless power signal at a reduced power level.

6. The power transmitter of claim 1, wherein the controller further comprises program instructions stored on the at least one machine-readable medium which, when executed by the at least one processor cause the controller to:
    receive power request signals from the power receiver; and
    determine power control signals based on the power request signals, wherein the power request comprises the power control signals.

7. The power transmitter of claim 6, wherein the external power supply is configured to:
    configure an input power to generate the DC input power supplied based on the power control signals, and
    provide the DC input power to the inverter circuit.

8. The power transmitter of claim 7, wherein the external power supply includes:
    a voltage regulator, and
    a power supply controller configured to:
        receive the power control signals;
        based on the power control signals, generate voltage regulation instructions for altering a DC voltage of the input power;
        provide the voltage regulation instructions to the voltage regulator; and
        provide the DC input power, based on the voltage regulation instructions, to the inverter circuit of the power transmitter.

9. The power transmitter of claim 8, wherein the voltage regulation instructions include voltage step up instructions or voltage step down instructions for the voltage regulator, the voltage step up instructions and voltage step down instructions having a step level, the step level being a change in voltage at which the voltage regulator is configured to step up or step down the DC voltage of the input power.

10. The power transmitter of claim 9, wherein the step level is in a range of about 10 millivolts (mV) to about 500 mV.

11. The power transmitter of claim 9, wherein the step level is about 200 mV.

12. The power transmitter of claim 1, wherein the AC wireless power signal includes a root mean square voltage, and wherein the controller further comprises program instructions stored on the at least one machine-readable medium which, when executed by the at least one processor cause the controller to:
generate a pulse width modulation signal for configuring an AC frequency for the AC wireless power signal at an operating frequency, the pulse width modulation signal modified by a duty cycle alteration, the duty cycle alteration configured to decrease the root mean square voltage of the AC wireless power signal.

13. The power transmitter of claim 12, wherein the root mean square voltage of the AC wireless power signal is less than a stepped up DC voltage or a stepped down DC voltage of the DC input power.

14. The power transmitter of claim 1, wherein the controller further comprises program instructions stored on the at least one machine-readable medium which, when executed by the at least one processor cause the controller to:
generate a pulse width modulation signal for configuring an AC frequency for the AC wireless power signal at an operating frequency, the pulse width modulation signal modified by a duty cycle alteration, the duty cycle alteration configured to alter an amount of power transmitted to the power receiver over a period of time.

15. The power transmitter of claim 1, wherein the coil is further configured to transmit the AC wireless power signal at an operating frequency selected from a range of about 87 kilohertz (kHz) to about 360 kHz.

16. A base station for wireless power transfer at an operating frequency, the base station comprising a power transmitter that comprises:
an inverter circuit configured to receive a direct current (DC) input power from an external power supply and convert the DC input power to an alternating current (AC) wireless power signal;
a coil configured to transmit the AC wireless power signal at the operating frequency to a power receiver, the coil formed of wound Litz wire and including at least one layer; and
a controller comprising:
at least one processor;
at least one machine-readable medium; and
program instructions stored on the at least one machine-readable medium which, when executed by the at least one processor, cause the controller to:
provide a power request to an external power supply for the DC input power at or above a power level for the power transmitter to provide the AC wireless power signal to the power receiver;
provide a driving signal to the inverter circuit for generating the AC wireless power signal;
monitor the AC wireless power signal at the coil, the AC wireless power signal based on the driving signal;
determine that the monitored AC wireless power signal at the coil is compliant with the power request;
based on determining that the monitored AC wireless power signal at the coil is compliant with the power request, verify power compliance for the external power supply and continue to operate for wireless power transmission;
determine that the AC wireless power signal is non-compliant with the power request;
based on determining that the monitored AC wireless power signal at the coil is non-compliant with the power request, store a flag of non-compliance for the external power supply; and
determine if the flag of non-compliance was caused by a shutdown of the power transmitter or a brownout of the power transmitter.

17. The base station of claim 16, wherein the controller further comprises program instructions stored on the at least one machine-readable medium which, when executed by the at least one processor cause the controller to:
based on determining that the flag of non-compliance was caused by the shutdown of the power transmitter, restart the power transmitter.

18. The base station of claim 16, wherein the controller further comprises program instructions stored on the at least one machine-readable medium which, when executed by the at least one processor cause the controller to:
based on determining that the flag of non-compliance was caused by the brownout of the power transmitter:
provide a reduced power request to the external power supply;
determine if a reduced AC wireless power signal at the coil is compliant with the reduced power request; and
based on determining that the reduced AC wireless power signal at the coil is compliant with the reduced power request, provide an updated driving signal to the inverter circuit for generating an updated AC wireless power signal at a reduced power level.

19. The base station of claim 16, wherein the controller further comprises program instructions stored on the at least one machine-readable medium which, when executed by the at least one processor cause the controller to:
receive power request signals from the power receiver; and
determine power control signals based on the power request signals, wherein the power request comprises the power control signals.

20. The base station of claim 16, wherein the operating frequency is selected from a range of about 87 kilohertz (kHz) to about 360 kHz.

* * * * *